(12) United States Patent
Song

(10) Patent No.: US 11,991,446 B2
(45) Date of Patent: May 21, 2024

(54) METHOD OF IMAGE STABILIZATION AND ELECTRONIC DEVICE THEREFOR

(71) Applicant: SAMSUNG ELECTRONICS CO., LTD., Suwon-si (KR)

(72) Inventor: Wonseok Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 17/851,717

(22) Filed: Jun. 28, 2022

(65) Prior Publication Data

US 2022/0417405 A1    Dec. 29, 2022

Related U.S. Application Data

(63) Continuation of application No. PCT/KR2022/003409, filed on Mar. 11, 2022.

(30) Foreign Application Priority Data

Jun. 29, 2021 (KR) .................. 10-2021-0084714

(51) Int. Cl.
     *H04N 23/68*      (2023.01)
     *H04N 23/695*     (2023.01)

(52) U.S. Cl.
     CPC ......... *H04N 23/684* (2023.01); *H04N 23/685* (2023.01); *H04N 23/695* (2023.01)

(58) Field of Classification Search
     CPC .. H04N 23/684; H04N 23/685; H04N 23/695; H04N 23/683; H04N 23/686; H04N 23/6812; H04N 23/90
     See application file for complete search history.

(56) References Cited

U.S. PATENT DOCUMENTS 8,743,219 B1 *   6/2014   Bledsoe ............. H04N 23/6812
                                                              348/208.4
9,568,712 B2    2/2017   Dror et al.
(Continued)

FOREIGN PATENT DOCUMENTS

KR   10-2009-0084483 A    8/2009
KR   10-2016-0014057 A    2/2016
(Continued)

OTHER PUBLICATIONS

International Search Report and Written Opinion dated Jul. 8, 2022, issued by the International Searching Authority in International Application No. PCT/KR2022/003409 (PCT/ISA/220, 210, 237).
(Continued)

*Primary Examiner* — Mekonnen D Dagnew
(74) *Attorney, Agent, or Firm* — Sughrue Mion, PLLC

(57) ABSTRACT

A method for operating an electronic device includes: obtaining an image using at least one of a first camera having a first FOV or a second camera comprising a reflective member and having a second FOV narrower than the first FOV; obtaining, from a motion sensor, first movement information of the electronic device, which is shaken to correspond to the obtaining of the image; obtaining information on movement of the reflective member of the second camera according to at least one of an optical image stabilizer (OIS) correction operation or an object tracking operation during at least a portion of a period in which the image is obtained; obtaining output information by performing an image stabilization operation with respect to the image based on at least one of the first movement information or the information on the movement of the reflective member; and outputting an image corrected by correcting distortion of the image based on a distortion variation resulting from the (Continued)

movement of the reflective member and the output information.

20 Claims, 13 Drawing Sheets

(56) References Cited

U.S. PATENT DOCUMENTS

| | | | |
|---|---|---|---|
| 9,599,796 B2 | 3/2017 | Shabtay et al. | |
| 9,743,001 B1* | 8/2017 | Stec | H04N 23/687 |
| 10,038,850 B2* | 7/2018 | Karttunen | H04N 23/6812 |
| 10,070,060 B2 | 9/2018 | Goldenberg et al. | |
| 10,194,090 B2* | 1/2019 | Matsuno | H04N 23/69 |
| 10,284,780 B2 | 5/2019 | Goldenberg et al. | |
| 10,288,896 B2 | 5/2019 | Shabtay et al. | |
| 10,348,969 B2 | 7/2019 | Murakami et al. | |
| 10,447,908 B2 | 10/2019 | Lee et al. | |
| 10,498,961 B2 | 12/2019 | Goldenberg et al. | |
| 10,498,962 B2 | 12/2019 | Iso et al. | |
| 10,498,965 B2* | 12/2019 | Fukai | G03B 3/10 |
| 10,620,450 B2 | 4/2020 | Shabtay et al. | |
| 10,965,871 B2 | 3/2021 | Song et al. | |
| 10,969,652 B2 | 4/2021 | Miller et al. | |
| 11,006,030 B2 | 5/2021 | Lee et al. | |
| 11,095,816 B2 | 8/2021 | Senda | |
| 11,128,803 B2 | 9/2021 | Joo et al. | |
| 11,363,199 B2 | 6/2022 | Lee et al. | |
| 2010/0245603 A1* | 9/2010 | Hashi | H04N 23/685 348/208.5 |
| 2015/0145950 A1 | 5/2015 | Murphy et al. | |
| 2017/0126978 A1* | 5/2017 | Yun | H04N 23/6812 |
| 2018/0091739 A1 | 3/2018 | Murakami et al. | |
| 2018/0109710 A1 | 4/2018 | Lee et al. | |
| 2018/0213153 A1 | 7/2018 | Iso et al. | |
| 2019/0089906 A1 | 3/2019 | Joo et al. | |
| 2019/0158750 A1* | 5/2019 | Kim | G03B 5/00 |
| 2019/0212632 A1 | 7/2019 | Miller et al. | |
| 2019/0222758 A1 | 7/2019 | Goldenberg et al. | |
| 2019/0281220 A1 | 9/2019 | Senda | |
| 2020/0244854 A1 | 7/2020 | Lee et al. | |
| 2020/0322534 A1 | 10/2020 | Lee et al. | |
| 2020/0404182 A1 | 12/2020 | Song et al. | |
| 2021/0223662 A1 | 6/2021 | Miller et al. | |

FOREIGN PATENT DOCUMENTS

| | | |
|---|---|---|
| KR | 10-2018-0042718 A | 4/2018 |
| KR | 10-2019-0017113 A | 2/2019 |
| KR | 10-2019-0088644 A | 7/2019 |
| KR | 10-2019-0089855 A | 7/2019 |
| KR | 10-2019-0095795 A | 8/2019 |

OTHER PUBLICATIONS

Communication dated Mar. 31, 2023 by the European Patent Office in European Patent Application No. 22711138.2.

* cited by examiner

METHOD OF IMAGE STABILIZATION AND ELECTRONIC DEVICE THEREFOR

CROSS-REFERENCE TO RELATED APPLICATIONS

This application is a bypass continuation application of International Application No. PCT/KR2022/003409, filed on Mar. 11, 2022, which is based on and claims the priority to Korean Patent Application No. 10-2021-0084714, filed on Jun. 29, 2021 in the Korean Intellectual Property Office, the disclosures of which are incorporated by reference herein in their entireties.

BACKGROUND

1. Field

The disclosure relates to a method of image stabilization and an electronic device therefor.

2. Description of Related Art

Recently, there has been provided an image stabilization function capable of preventing the afterimage of the captured image, which is caused due to the hand shake or the unintentional movement of a user. The image stabilization may include a video digital image stabilization (VDIS) scheme or a digital image stabilization (DIS) scheme.

SUMMARY

An electronic device may provide a function of tracking an object by moving a lens. When the lens is moved to track the object, an image may be distorted and blurred due to the movement of the object. To correct the distortion and blurring of the image, after the distortion of the image resulting from the movement of the lens is corrected, the corrected image is transmitted to an image stabilization module, such that the blurring of the image is corrected, for example, digital image stabilization (DIS). The above method may include a plurality of operations of outputting images that may cause degradation to image quality.

Various embodiments of the disclosure may provide an electronic device configured to simultaneously correct the distortion and the blurring of the image to correspond to the movement of a field of view (FOV) in a camera system configured to move the FOV of a camera or a lens using a reflective member, for example, a prism or a mirror.

According to an aspect of the disclosure, there is provided an electronic device including: a camera module comprising a first camera having a first field of view (FOV) and a second camera having a second FOV narrower than the first FOV, the second FOV is positioned in the first FOV; a motion sensor; and a processor electrically connected to the camera module and the motion sensor, wherein the second camera comprises: at least one lens; a reflective member configured to rotate relative to the at least one lens; and an image sensor configured to generate an electrical signal based on light incident through the reflective member and the at least one lens, and wherein the processor is configured to: obtain an image using the camera module; obtain, from the motion sensor, first movement information of the electronic device which is shaken, to correspond to the obtaining of the image; obtain information on movement of the reflective member of the second camera according to at least one of an optical image stabilizer (OIS) correction operation or an object tracking operation during at least a portion of a period in which the image is obtained; obtain output information by performing an image stabilization operation with respect to the image, based on at least one of the first movement information or the information on the movement of the reflective member; and output an image corrected by correcting distortion of the image, based on a distortion variation resulting from the movement of the reflective member and the output information.

According to an aspect of the disclosure, there is provided a method for operating an electronic device, the method including: obtaining an image using at least one of a first camera having a first FOV or a second camera comprising a reflective member and having a second FOV narrower than the first FOV, the second FOV is positioned in the first FOV; obtaining, from a motion sensor, first movement information of the electronic device, which is shaken to correspond to the obtaining of the image; obtaining information on movement of the reflective member of the second camera according to at least one of an optical image stabilizer (OIS) correction operation or an object tracking operation during at least a portion of a period in which the image is obtained; obtaining output information by performing an image stabilization operation with respect to the image based on at least one of the first movement information or the information on the movement of the reflective member; and outputting an image corrected by correcting distortion of the image based on a distortion variation resulting from the movement of the reflective member and the output information.

According to various embodiments of the disclosure, the electronic device may minimize degradation of the image quality and reduce a current consumption by correcting the blurring and the distortion caused by the movement of the FOV of the camera in the camera system configured to move the FOV of the camera or the lens using the reflective member.

BRIEF DESCRIPTION OF THE DRAWINGS

In the following description made with respect to the accompanying drawings, similar components will be assigned with similar reference numerals.

DETAILED DESCRIPTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
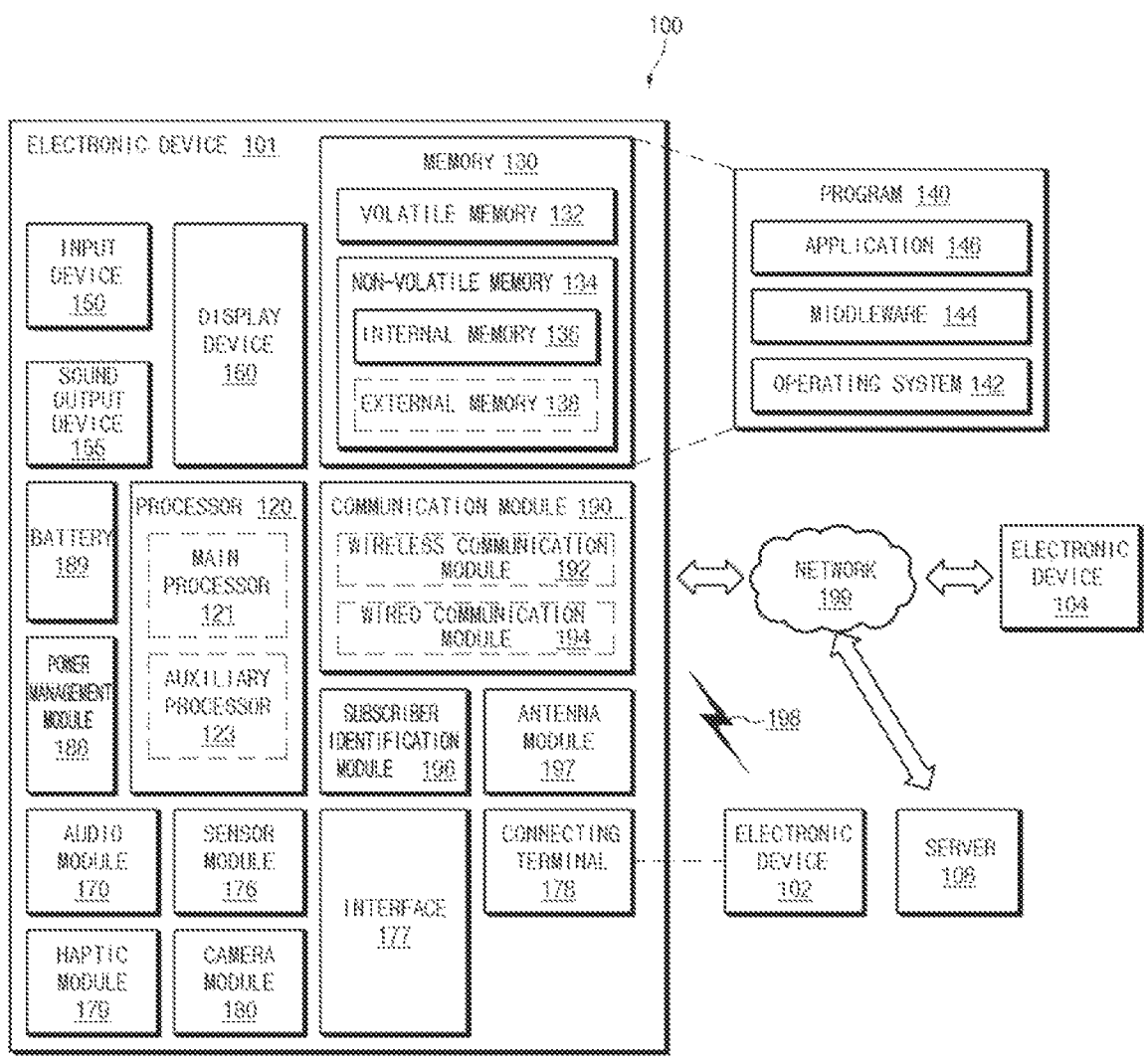
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate fora communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
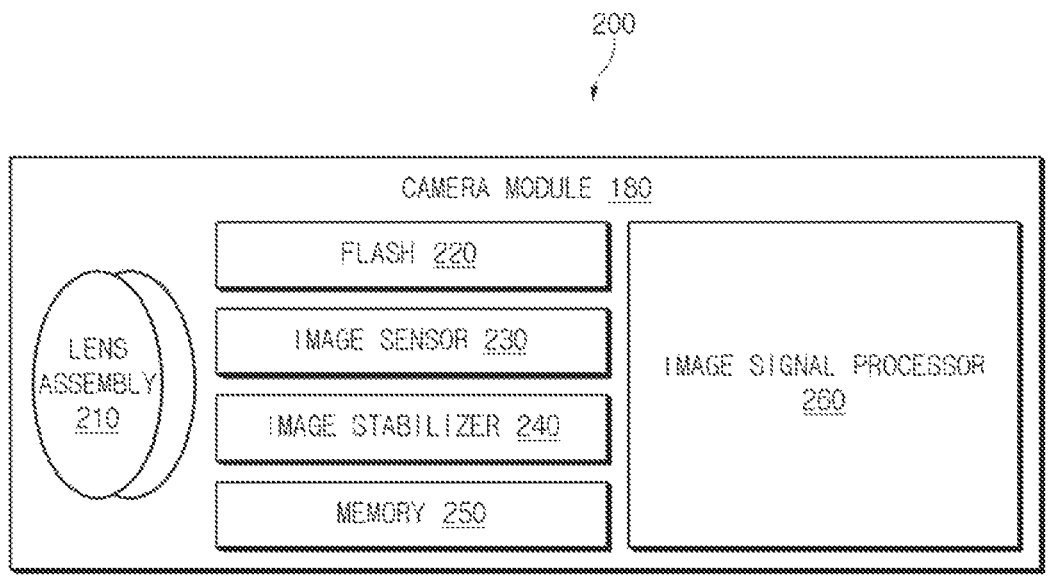
FIG. 2 is a block diagram illustrating the camera module according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), and an image signal processor 260. The lens assembly 210 may collect light emitted or reflected from an object whose image is to be taken. The lens assembly 210 may include one or more lenses.

According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include an image sensor selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor or an acceleration sensor disposed inside or outside of the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored in the memory 250 for further processing, or may be provided to an external component (e.g., the memory 130, the display module 160, the electronic device 102, the electronic device 104, or the server 108) outside the camera module 180.

According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
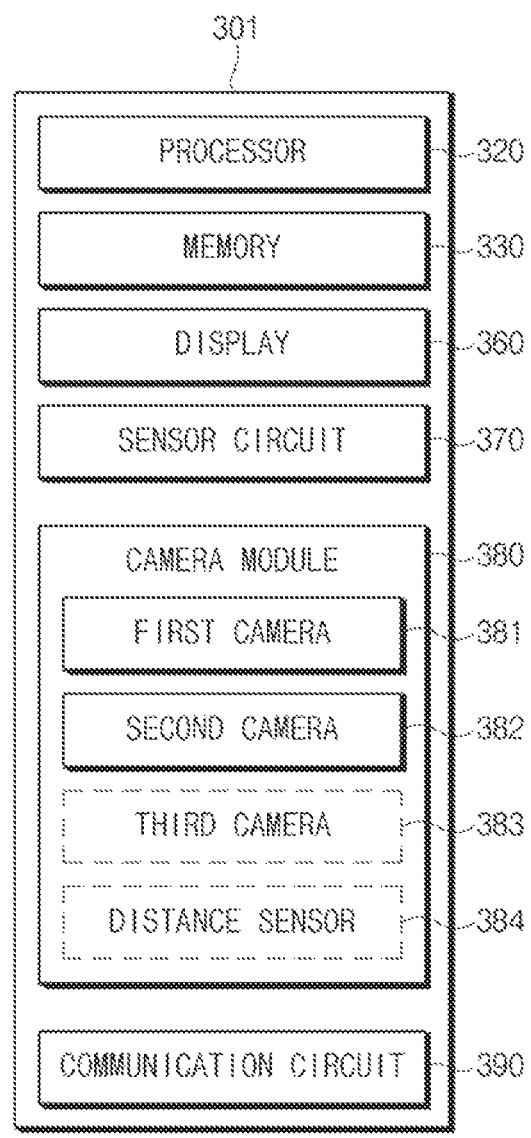
FIG. 3 illustrates a block diagram of an electronic device according to an embodiment.

FIG. 3 illustrates a block diagram of an electronic device, according to an embodiment of the disclosure.

Referring to FIG. 3, according to an embodiment, an electronic device 301 (e.g., the electronic device 101 of FIG. 1) may include a processor 320 (e.g., the processor 120 of FIG. 1), a memory 330 (e.g., the memory 130 of FIG. 1), a display 360 (e.g., the display module 160 of FIG. 1), a sensor circuit 370 (e.g., the sensor module 176 of FIG. 1), a camera module 380 (e.g., the camera module 180 of FIG. 1), and/or a communication circuit 390 (e.g., the communication module 190 of FIG. 1).

For example, the processor 320 may be operatively connected with the memory 330, the display 360, the sensor circuit 370, the camera module 380, and the communication circuit 390. The memory 330 may store one or more instructions that may be executed by the processor 320 to perform various operations of the electronic device 301.

According to an embodiment, the display 360 includes a plurality of pixels. For example, the electronic device 301 may display an image, which is obtained through the camera module 380, on the display 360. The display 360 may include a touch screen to sense a touch input. The electronic device 301 may identify an object (or a subject) in the displayed image, based on an input to the display 360. For example, a user may capture a moving picture while tracking a relevant object through a touch input to the displayed object.

The sensor circuit 370 senses the movement of the electronic device 301. For example, the sensor circuit 370 includes at least one sensor (e.g., a motion sensor, a gyro sensor, an acceleration sensor, and/or an inertial sensor) to sense movement information of the electronic device 301. The electronic device 301 senses the movement information of the electronic device 301 using the sensor circuit 370 and controls the camera module 380, based on the movement information and the movement of the object. For example, the electronic device 301 may move a lens (e.g., a lens unit 520 of FIG. 5) or a reflective member or device (e.g., a reflective member or device 540 of FIG. 5) of a second camera 382, based on the movement information of the electronic device 301. The second camera 382 is configured to provide an optical image stabilization function or an object tracking function by moving the reflective member 540. However, embodiments are not limited thereto. According to various embodiments, the second camera 382 may be configured to provide the optical image stabilization function by moving the lens unit 520.

According to an embodiment, the camera module 380 may include a plurality of cameras. For example, the camera module 380 includes a first camera 381 and the second camera 382. The first camera 381 has a first field of view (FOV). For example, the first camera 381 may be a wide camera, and may include at least one wide-angle lens. The second camera 382 has a second FOV. The second FOV may be narrower than the first FOV. For example, the second camera 382 may be a tele-camera, and may include at least one telephoto lens.

According to an embodiment, the camera module 380 may further include a third camera 383. The third camera 383 may have a third FOV. The third FOV may be wider than the first FOV. For example, the third camera 383 may be an ultra-wide angle camera and may include at least one ultra wide angle lens. According to various embodiments, the camera module 380 may not include the third camera 383.

According to an embodiment, the first camera 381, the second camera 382, and the third camera 383 may be disposed in the electronic device 301 to face the same direction with respect to the electronic device 301. For example, the first camera 381, the second camera 382, and the third camera 383 may be disposed on a rear surface of the electronic device 301. At least one of the first camera 381, the second camera 382, and the third camera 383 may include a component (e.g., an optical image stabilizer (OIS) driving module) for image stabilization. The second camera 382 may be configured to move the central direction of the second FOV. Hereinafter, an operation of moving the position of the FOV (second FOV) of the second camera 382 may be referred to as an operation of moving the central axis of the second FOV of the second camera 382 by rotating the reflective member (e.g., the reflective member 540 of FIGS. 5 to 7), which is included in the second camera 382, within a specific range. Moving the central axis of the second FOV of the second camera 382 will be described later with reference to FIGS. 5 to 7.

According to an embodiment, the camera module 380 may further include a distance sensor 384. The distance sensor 384 may include at least one sensor to measure a distance between the camera module 380 and the object. For example, the distance sensor 384 may include a time of flight (ToF) sensor, a laser sensor, an infrared sensor, and/or a light detection and ranging (LiDAR) sensor but the invention is not restricted thereto. The electronic device 301 may be configured to perform auto focusing (AF) using the distance sensor 384.

According to an embodiment, the communication circuit 390 may be configured to support short-range wireless communication and/or long-range wireless communication. For example, the communication circuit 390 may support short-range wireless communication such as Bluetooth (e.g., Bluetooth legacy and/or Bluetooth low energy (BLE)), a neighbor awareness network (NAN), Wi-Fi direct, and/or an ultra-wide band (UWB).

Components of the electronic device 301 illustrated in FIG. 3 are provided for the illustrative purpose, and embodiments are not limited thereto. The electronic device may further include components (at least one of the components of the electronic device 101 of FIG. 1) not illustrated in FIG. 3. For example, the electronic device 301 may further include a battery and a housing. Hereinafter, the operations of the electronic device 301 will be described by making reference to components of the electronic device 301 described with reference to FIG. 3. For example, the operations of the electronic device 301 may be performed by the processor 320.

Figure 4:
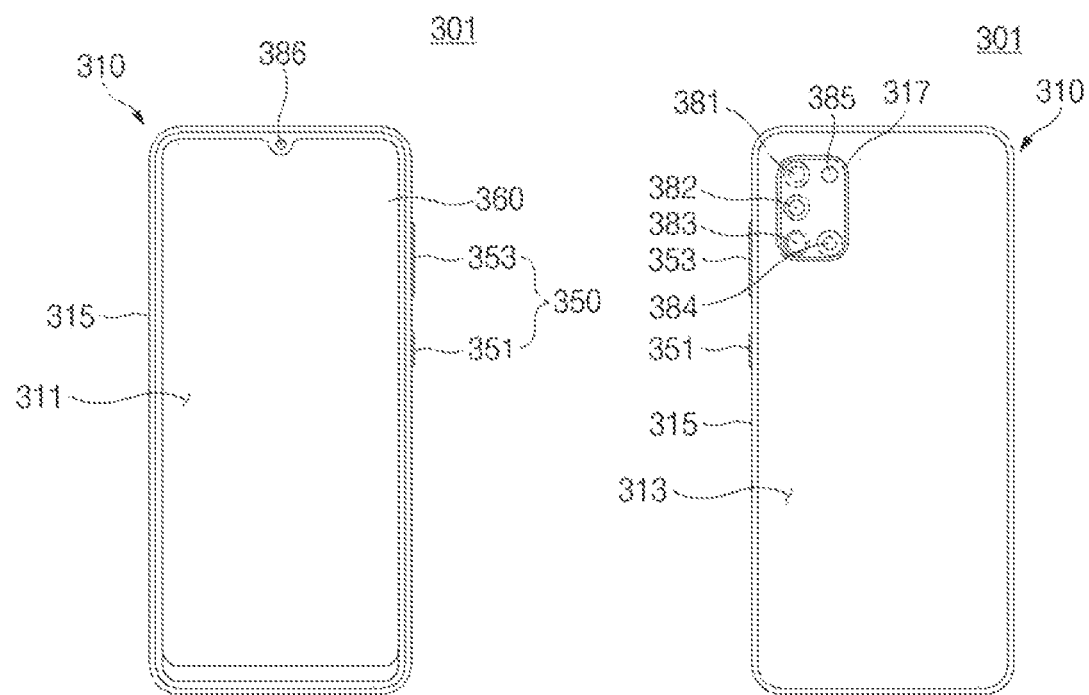
FIG. 4 illustrates an electronic device according to an embodiment.

FIG. 4 illustrates an electronic device, according to an embodiment.

Referring to FIG. 4, according to an embodiment, the electronic device 301 may include a housing 310, an input device 350 (e.g., the input module 150 of FIG. 1), the display 360, and the camera module 380.

According to an embodiment, the housing 310 may form an outer appearance of the electronic device 301. For example, the housing 310 may include a front surface 311, a rear surface 313 facing a direction opposite to that of the front surface 311, and a side surface 315 to surround a space between the front surface 311 and the rear surface 313. According to various embodiments, the housing 310 may be a structure forming some of the front surface, the rear surface, and the side surface.

According to an embodiment, the housing 310 may be provided to have the display 360 and the camera module 380 disposed in the housing 310. For example, the housing 310 may be configured such that at least a portion of the display 360 is visually exposed through the front surface 311 and at least a portion of the camera module 380 is visually exposed through the rear surface 313. According to various embodiments, other components (e.g., the processor 320, the memory 330, the sensor circuit 370, and the communication circuit 390 of FIG. 3) of the electronic device 301 may be disposed in the housing 310.

According to an embodiment, the input device 350 may be disposed on the side surface 315 of the housing 310. The input device 350 may be referred to as a key input device. For example, the input device 350 may include one or more side keys or side buttons. The input device 350 may include a power key 351 and/or a volume key 353. According to various embodiments, the electronic device 301 may not include some or the entire portion of the input device 350, and the input device 350 not included may be implemented in another form, such as a soft key, on the display 360.

According to an embodiment, the camera module 380 may include the first camera 381, the second camera 382, the third camera 383, the distance sensor 384, a flash 385, and a fourth camera 386. For example, the first camera 381, the second camera 382, and the third camera 383 may be rear cameras, and the fourth camera 386 may be a front camera.

According to an embodiment, the first camera 381, the second camera 382, the third camera 383, the distance sensor 384, and/or the flash 385 may be visually exposed through at least a portion of a camera decorating member 317 disposed on the rear surface 313 of the housing 310. The camera decorating member 317 may include a plurality of transparent areas formed of a transparent member. For example, the first camera 381, the second camera 382, the third camera 383, and the distance sensor 384 may be configured to receive light from the outside or obtain an external image through the transparent area of the camera decorating member 317. For example, the flash 385 may be configured to emit light to the outside through the transparent area of the camera decorating member 317.

Although arrangement and configuration of rear cameras illustrated in FIG. 4 are provided for the illustrative purpose, embodiments of the disclosure are not limited thereto. For example, the camera decorating member 317 may further include a microphone hole). At least some of the illustrated components may be omitted. According to various embodiments, the camera decorating member 317 may be formed to protrude to a specific height from the rear surface 313 of the housing 310, or may form substantially the same plane as the rear surface 313.

According to an embodiment, the fourth camera 386 may be visually exposed through the front surface 311 of the housing 310 through a portion of the display 360. For example, the fourth camera 386 may be configured to receive light from the outside or obtain an external image through the camera hole formed in a portion of the display 360. According to various embodiments, the fourth camera 386 may be provided in the form of a punch-hole camera or an under display camera (UDC).

Figure 5:
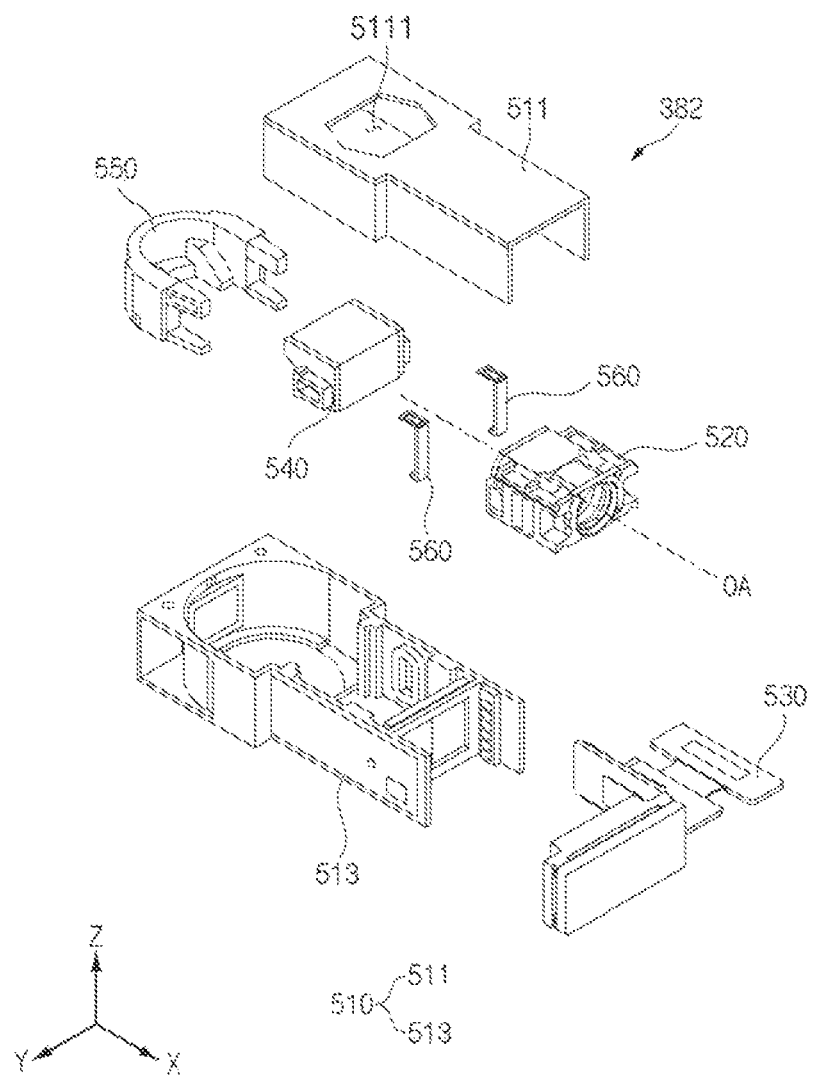
FIG. 5 illustrates second camera according to an embodiment.
Figure 6:
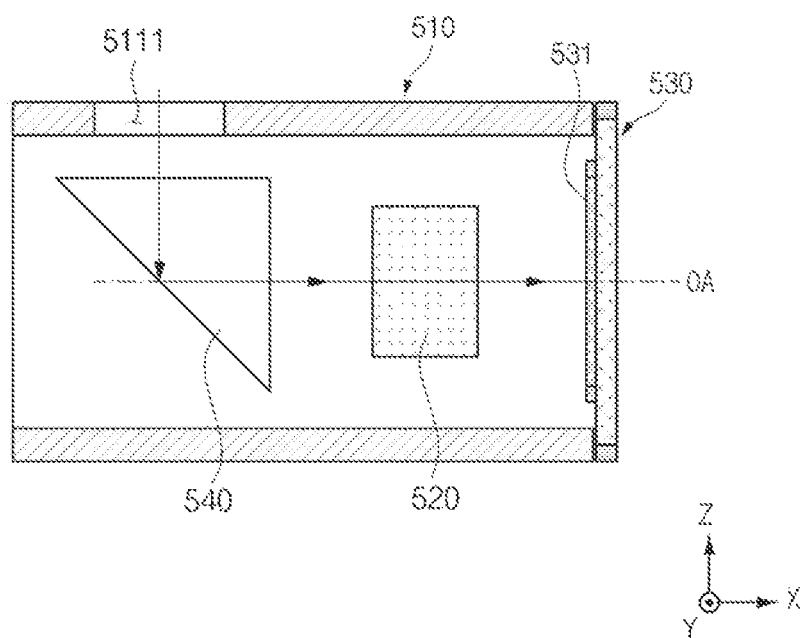
FIG. 6 illustrates a second camera according to an embodiment.

FIG. 5 illustrates a second camera, according to an embodiment. FIG. 6 illustrates a second camera, according to an embodiment.

FIG. 5 is an exploded perspective view of the second camera 382.

FIG. 6 is a view schematically illustrating a cross-section of the second camera 382. For example, FIG. 6 may be a cross-sectional view illustrating a cross section of the second camera 382, which is taken in a direction parallel to an x-axis.

Referring to FIGS. 5 and 6, according to an embodiment, the second camera 382 may include a camera housing 510, the lens unit 520, an image sensor assembly 530, the reflective member 540, a guide member 550, and a fixing member 560.

According to an embodiment, the second camera 382 may have a structure (e.g., a folded-type camera) in which a direction (e.g., a z-axis direction) of external light incident onto the second camera 382 is perpendicular to an optical axis OA of a lens included in the lens unit 520. For example, the lens or an image sensor 531 of the second camera 382 may be disposed to be substantially perpendicular to the rear surface (e.g., the rear surface 313 of the housing 310 of FIG. 4) of the electronic device 301, and the second camera 382 is configured to change an optical path through the reflective member 540.

According to an embodiment, the camera housing 510 may include an upper housing 511 and a lower housing 513. The reflective member 540 may be positioned inside the lower housing 513, and may receive light from the outside of the camera housing 510 through an opening 5111 formed in the upper housing 511. The reflective member 540 may reflect and/or refract light, which is incident in the z-axis direction, in the x-direction (e.g., in the direction of the lens unit 520). The reflective member 540 may be fixed to the guide member 550 by the fixing member 560. For example, the reflective member 540 may be referred to as the lens assembly (e.g., the lens assembly 210 of FIG. 2) of the second camera 382, together with the lens unit 520. The lens assembly of the second camera 382 may be understood as a prism type lens assembly. For example, in the second camera 382, the optical path onto the lens unit 520 and the image sensor 531 may be changed depending on the movement of the prism (e.g., the reflective member 540). Hereinafter, in the second camera 382, the movement and/or rotation of the reflective member 540 may refer to an operation of moving the second FOV of the second camera 382.

According to various embodiments, the reflective member 540 may include a mirror or a prism, and the reflective member 540 is not limited to the above-described examples. For example, the reflective member 540 may be implemented by using various components to change the traveling path of light by refracting and/or reflecting the light.

According to an embodiment, the guide member 550 may be positioned inside the lower housing 513. The guide member 550 may be configured to guide rotation of the reflective member 540. For example, the guide member 550 may include at least one magnetic member (e.g., a magnet and/or an electromagnet). The electronic device 301 may move the guide member 550 by adjusting the magnetism of the magnetic member positioned in the lower housing 513. For example, the guide member 550 may include at least one gear. The electronic device 301 may move the guide member 550 by controlling a driver positioned in the lower housing 513 and operated together with the gear of the guide member 550. For example, the electronic device 301 may rotate the reflective member 540 about at least one rotation axis (e.g., a first rotation axis 701 and a second rotation axis 702 of FIG. 7) perpendicular to the optical axis OA by moving the guide member 550. The electronic device 301 may perform an image stabilization function (e.g., OIS correction) and/or an object tracking function.

According to an embodiment, the lens unit 520 may include a plurality of lens. For example, the electronic device 301 may perform a focusing function (e.g., an AF function) by moving the plurality of lenses of the lens unit 520 in a direction parallel to the optical axis OA. The optical axis OA may be defined as a line linking the center of the lens to the focus. The lens unit 520 may transmit light refracted by the reflective member 540 to the image sensor assembly 530 or the image sensor 531 (e.g., the image sensor 230 of FIG. 2). The image sensor assembly 530 may convert an optical signal received through the lens unit 520 into an electrical signal, and may transmit the converted electrical signal to the processor (e.g., the image signal processor 260 of FIG. 2).

Hereinafter, the path through which the external light reaches the image sensor 531 of the second camera 382 will be described with reference to FIG. 6.

According to an embodiment, the second camera 382 may receive external light through the opening 5111 of the camera housing 510. The external light may be incident on the reflective member 540 through the opening 5111. For example, the reflective member 540 may be positioned to receive the external light, preferably under the opening 5111 of the camera housing 510 (e.g., in the −z-axis direction). According to various embodiments, the opening 5111 may be aligned with the transparent area formed in the camera decorating member (e.g., the camera decorating member 317 of FIG. 4) in the z-axis direction. The external light may be incident on the reflective member 540 in the −z-axis direction through the transparent area and the opening 5111 of the camera decorating member 317. Light incident on the reflective member 540 is refracted in the +x-axis direction. The light refracted in the +x-axis direction may pass through the lens unit 520 and may enter the image sensor 531. Light passing through the lens of the lens unit 520 may be focused on the image sensor 531 of the image sensor assembly 530.

As described above with reference to FIG. 3, the electronic device 301 may move the lens assembly (e.g., the reflective member 540 and/or the lens unit 520) of the second camera 382. The electronic device 301 may move the reflective member 540 and/or the lens unit 520 of the second camera 382. For example, the movement of the lens unit 520 in the optical axis OA direction may be an operation for performing an auto-focus function of the second camera 382. The movement (e.g., rotation) of the reflective member 540 may be an operation for performing an image stabilization function and/or an object tracking function of the second camera 382. Hereinafter, a movement (e.g., rotation) of the reflective member 540 of the second camera 382 according to an embodiment is described with reference to FIGS. 6 and 7.

Figure 7:
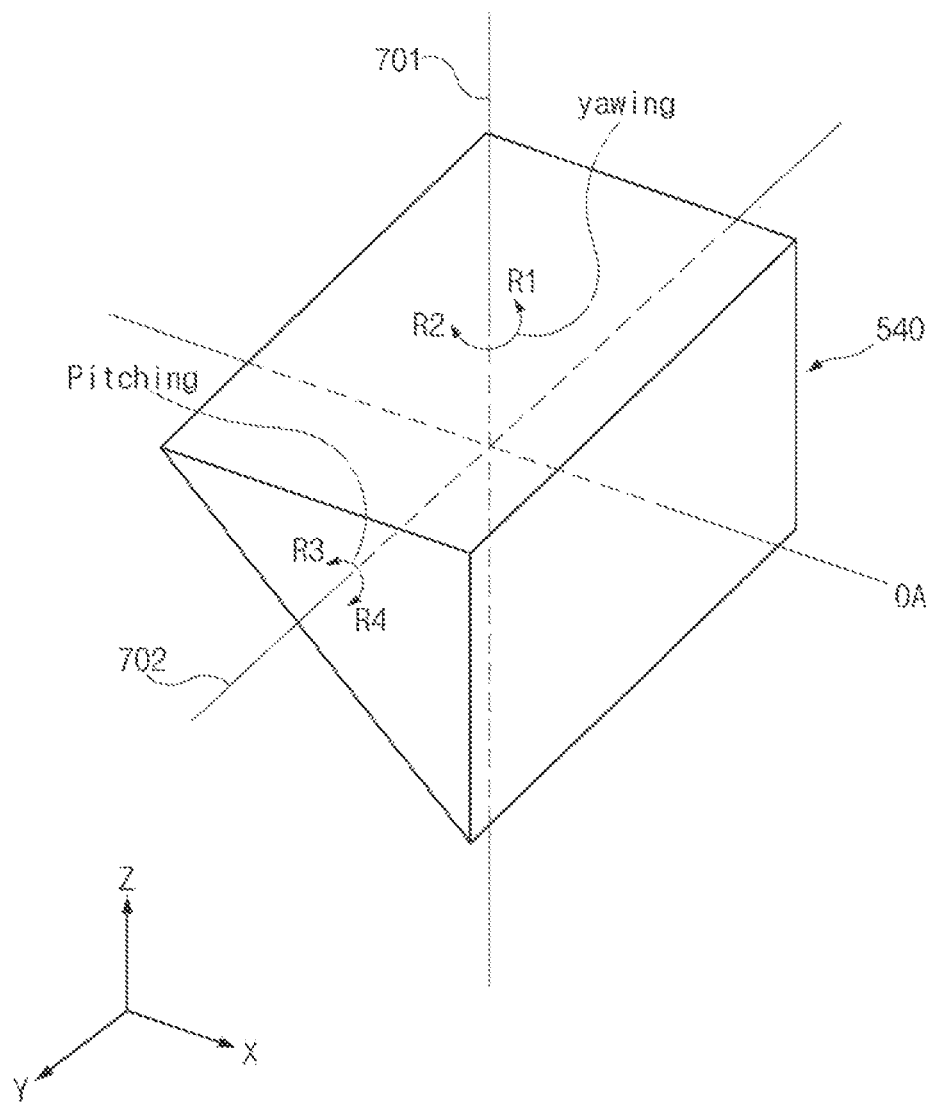
FIG. 7 illustrates a rotation operation of a reflective member of a second camera according to an embodiment.

FIG. 7 illustrates a rotation operation of a reflective member of a second camera according to an embodiment.

Referring to FIGS. 6 and 7, according to an embodiment, the electronic device 301 may perform an image stabilization function and/or an object tracking function by rotating the reflective member 540 of the second camera 382 within a specific range about rotation axes 701 and 702. For example, the second camera 382 may move or change the field of view (e.g., the second FOV) or the line of vision of the second camera 382, as the optical path incident on the lens unit 520 is changed by the rotation operation of the reflective member 540.

According to an embodiment, the reflective member 540 may be configured to rotate in a specified range about the first rotation axis 701 and the second rotation axis 702 perpendicular to the optical axis OA of the lens. The first rotation axis 701 and the second rotation axis 702 may be substantially perpendicular to each other. For example, the optical axis OA may be a virtual axis extending parallel to the x-axis. The first rotation axis 701 may be a virtual axis extending parallel to the z-axis. The second rotation axis 702 may be a virtual axis extending parallel to the y-axis.

According to an embodiment, an operation in which the reflective member 540 rotates about the first rotation axis 701 may be understood as a yaw tilt driving or yawing operation. The electronic device 301 may perform a first rotation R1 for the reflective member 540. The first rotation R1 may refer to an operation of rotating the reflective member 540 in a first rotation direction (e.g., counterclockwise when viewed based on FIG. 7) about the first rotation axis 701. The electronic device 301 may perform a second rotation R2 for the reflective member 540. The second rotation R2 may refer to an operation of rotating the reflective member 540 in a second rotation direction which is opposite to the first rotation direction (e.g., clockwise when viewed based on FIG. 7) about the first rotation axis 701.

According to an embodiment, an operation in which the reflective member 540 rotates about the second rotation axis 702 may be understood as a pitch tilt driving or pitching operation. The electronic device 301 may perform a third rotation R3 for the reflective member 540. The third rotation R3 may refer to an operation of rotating the reflective member 540 in a third rotation direction (e.g., counterclockwise when viewed based on FIG. 7) about the second rotation axis 702. The electronic device 301 may perform a fourth rotation R4 for the reflective member 540. The fourth rotation R4 may refer to an operation of rotating the reflective member 540 in a fourth rotation direction which is opposite to the third rotation direction (e.g., clockwise when viewed based on FIG. 7) about the second rotation axis 702.

Although FIG. 7 illustrates that the first rotation axis 701 and the second rotation axis 702 pass through the reflective member 540 such that the first rotation axis 701 and the second rotation axis 702 are positioned inside the reflective member 540, embodiments are not limited thereto. For example, the first rotation axis 701 or the second rotation axis 702 may be positioned outside the reflective member 540 without overlapping the reflective member 540. According to various embodiments, the first rotation axis 701 and the second rotation axis 702 may be formed by the guide member (e.g., the guide member 550 of FIG. 5).

The reflective member 540 may be configured to rotate about an axis (e.g., an x axis) parallel to the optical axis OA. For example, an operation in which the reflective member 540 rotates about the x axis may be a roll tilt driving or rolling operation.

According to an embodiment, when the electronic device 301 moves, for example, by being shaken while the camera module 380 (or the second camera 382) is obtaining the image, the electronic device 301 (or the image stabilizer 240 of FIG. 2) may perform an OIS correction operation to compensate for the movement such as shaking of the electronic device 301. For example, the electronic device 301 may perform the OIS correction operation by rotating the reflective member 540 of the second camera 382 about the first rotation axis 701 and/or the second rotation axis 702 to cope with the shaking of the electronic device 301, which is sensed through the sensor circuit (e.g., the sensor circuit 370 of FIG. 3). However, the above-described OIS correction manner is provided for the illustrative purpose. According to various embodiments, the electronic device 301 may perform the OIS correction operation in a sensor shift manner to move the image sensor 531.

Figure 9:
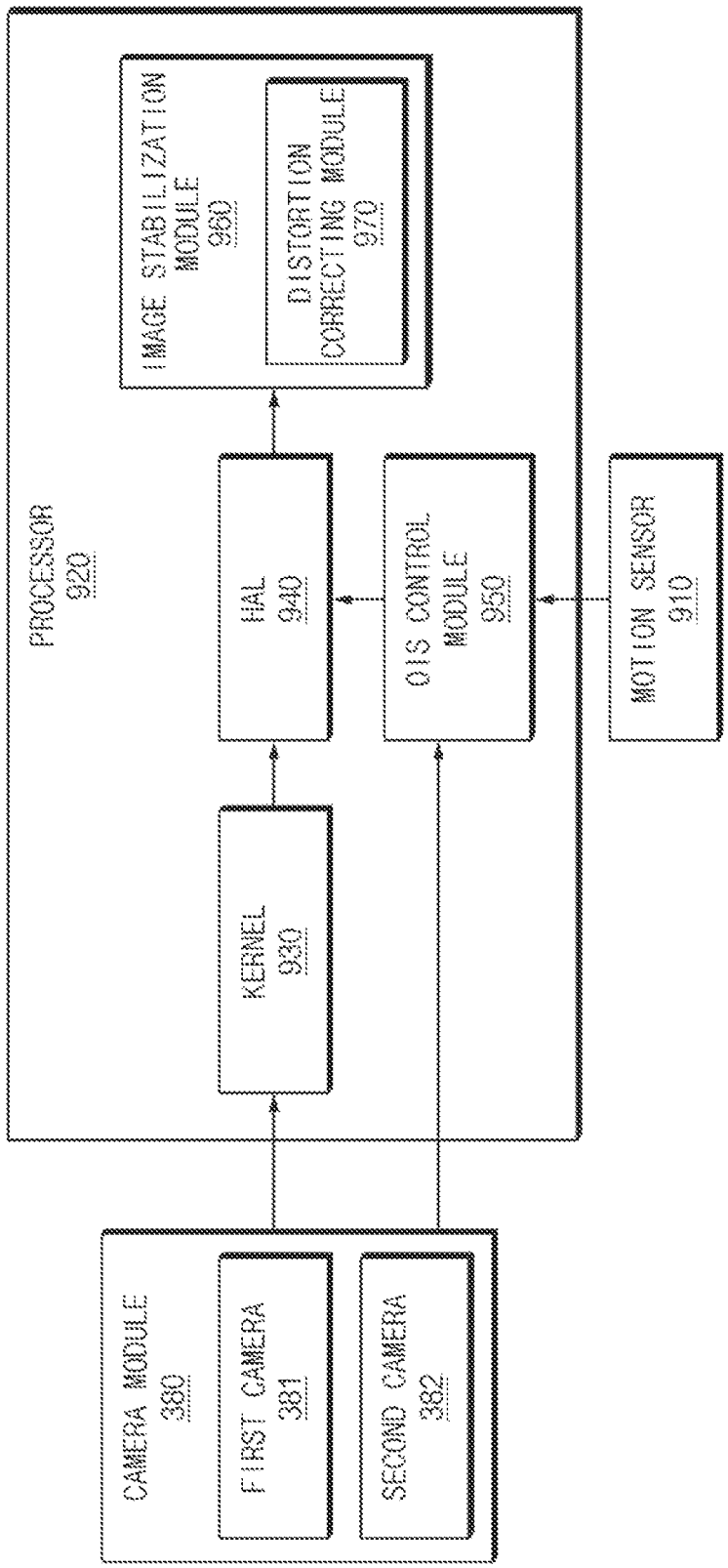
FIG. 9 illustrates a block diagram of an image stabilization system of an electronic device according to an embodiment.

The electronic device 301 senses the movement such as shaking of the electronic device 301 using the sensor circuit 370 (e.g., a motion sensor 910 of FIG. 9). According to embodiments, information corresponding to the movement of the electronic device 301 is referred to as first movement information or gyro data. In addition, according to embodiments, information, which corresponds to the movement of some components (the lens unit 520 and/or the reflective member 540) of the lens assembly, resulting from the OIS correction is referred to as second movement information or OIS movement data. In addition, according to embodiments, information, which corresponds to the movement of some components (the lens unit 520 and/or the reflective member 540) of the lens assembly, resulting from object tracking is referred to as third movement information or object tracking movement data. According to an embodiment, the first movement information, the second movement information, or the third movement information may be expressed as the change in an angle, or a vector over time.

Figure 8:
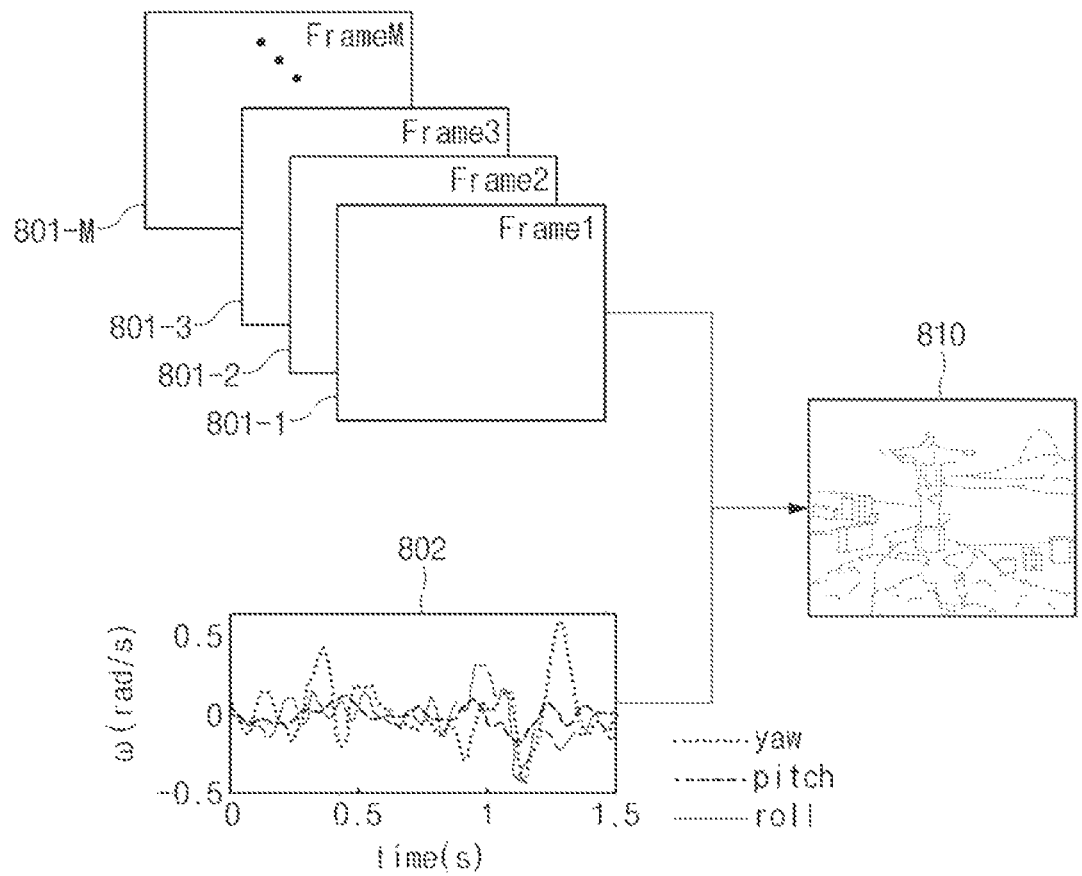
FIG. 8 illustrates a DIS correction operation of an electronic device according to an embodiment.

FIG. 8 illustrates a digital image stabilization (DIS) correction operation of an electronic device according to an embodiment.

Referring to FIG. 8, according to an embodiment, the electronic device 301 may generate an image 810 by performing the DIS correction (or video digital image stabilization (VDIS) correction) operation, based on at least one of a plurality of image frames 801-1, 801-2, 801-3, . . . , and 801-M (M is a natural number equal to or greater than '4'), which are obtained through the camera module 380, and first movement information 802 (e.g., the gyro data) corresponding to the movement of the electronic device 301. For example, the DIS correction operation may be referred to as electronic image stabilization (EIS) correction operation. The number of image frames is not limited to an example illustrated in FIG. 8. For example, the camera module 380 may obtain one or more image frames.

According to an embodiment, the electronic device 301 may identify a blurring degree of an image by comparing the plurality of image frames 801-1, 801-2, 801-3, . . . , and 801-M with each other through a difference image analysis (DIA) scheme. For example, the electronic device 301 may identify a feature point in the image frames 801-1, 801-2, 801-3, . . . , and 801-M and may identify the blurring degree of the image, based on a position, a distance, or a direction in which the feature point moves in the image frames. For example, the feature point may be used interchangeably with an edge, a feature, a key point, an interesting point, or a corner.

According to embodiments, information indicating the movement of the feature point in the image frame may be referred to as fourth movement information or image movement. According to an embodiment, the fourth movement information may refer to information corresponding to the change between the plurality of image frames. For example, the electronic device 301 may determine the fourth movement information corresponding to the movement of one feature point by comparing two image frames (e.g., an N-th frame and an (N+1)-th frame) with each other.

According to an embodiment, the electronic device 301 may perform DIS correction operation using the fourth movement information and the first movement information 802. The electronic device 301 may obtain the first movement information 802 corresponding to the movement of the electronic device 301 through the motion sensor (e.g., the sensor circuit 370 of FIG. 3). For example, the first movement information 802 may indicate movement information of the electronic device 301 that is shaken in at least one of a roll direction, a yaw direction, or a pitch direction.

According to various embodiments, the electronic device 301 may perform the DIS correction operation based on the first movement information (e.g., gyro data), the second movement information (e.g., the OIS movement data) and/or the third movement information (e.g., the object tracking movement data), together with the fourth movement information (e.g., the image movement). For example, the electronic device 301 may perform the DIS correction operation based on fifth movement information, which is obtained by removing the second movement information (e.g., the movement information of the lens assembly (the reflective member 540) of the second camera 382) from the first movement information, or sixth movement information obtained by additionally removing the third movement information (e.g., the movement information of the lens assembly (the reflective member 540) of the second camera 382 through the object tracking) from the fifth movement information (e.g., the fifth movement information=first movement information−second movement information).

FIG. 9 illustrates a block diagram of an image stabilization system of an electronic device according to an embodiment.

Referring to FIG. 9, according to an embodiment, the electronic device 301 may include the camera module 380, the motion sensor 910 (e.g., the sensor circuit 370 of FIG. 3) and a processor 920 (e.g., the processor 320 of FIG. 3).

According to an embodiment, the camera module 380 may convert light, which is reflected from an object, into an electrical signal to obtain an image (e.g., a plurality of image frames or image data) of the object, and may transmit the image to the processor 920. The camera module 380 performs the OIS correction operation to correspond to the movement of the electronic device 301, when the electronic device 301 is shaken while the image is being obtained. The camera module 380 includes a lens assembly (e.g., the lens assembly 210 of FIG. 2), an image sensor (e.g., the image sensor 230 in FIG. 2), and an optical image stabilizer (e.g., the image stabilizer 240 of FIG. 2).

According to an embodiment, the camera module 380 is configured in the form of a multi-camera system including the first camera 381 and the second camera 382. For example, the camera module 380 includes the first camera 381 having the first FOV and the second camera 382 having the second FOV narrower than the first FOV. The camera module 380 may be configured such that the second camera 382 moves within the first FOV of the first camera 381. For example, the central axis of the second FOV of the second camera 382 may be rotated within a specified angular range in the first FOV of the first camera 381. An operation, in which the second camera 382 moves within the first FOV, will be described below with reference to FIG. 10.

According to an embodiment, the camera module 380 may transmit a synchronization signal to the processor 920. For example, the camera module 380 may be configured to transmit the synchronization signal to an OIS control module 950 to identify the first movement information and/or the second movement information synchronized with an image which is input to the processor 920. For example, the camera module 380 may be configured to transmit the synchronization signal to the OIS control module 950 at a time or a time point at which the image sensors of the first camera 381 and/or the second camera 382 obtain the image. The synchronization signal may include information on the current time. For example, the camera module 380 may be connected to the OIS control module 950 by vertical synchronization (VSync). The synchronization signal may be a vertical synchronization signal, but is not limited thereto. According to various embodiments, the camera module 380 may obtain an image and/or output a synchronization signal through an image sensor included in the camera module 380.

According to an embodiment, the synchronization signal may include at least one of a first synchronization signal output at a time point at which the first camera 381 obtains the image and a second synchronization signal output at a time point at which the second camera 382 obtains the image. For example, only the first camera 381 may transmit the first synchronization signal to the OIS control module 950, and an image obtained by the second camera 382 may be connected in synchronization with movement information (e.g., the first movement information) of the electronic device to be matched to the first synchronization signal of the first camera 381.

According to an embodiment, the motion sensor 910 may measure the first movement information corresponding to the movement of the electronic device 301 during at least a portion of a period in which the camera module 380 obtains the image. The period may be a time window including a time point of the event of image capturing. The motion sensor 910 may include, for example, a gyro sensor or an acceleration sensor. The motion sensor 910 may be embedded in the camera module 380 or may be disposed outside of the camera module 380. According to an embodiment, the motion sensor 910 may transmit the first movement information to the processor 920. For example, the motion sensor 910 transmits the first movement information to the OIS control module 950. According to various embodiments, the motion sensor 910 may consecutively transmit the first movement information to the OIS control module 950 while the first camera 381 or the second camera 382 is obtaining an image.

According to an embodiment, the processor 920 may receive an image, which is OIS-corrected, from the camera module 380 and may receive the first movement information from the motion sensor 910. The processor 920 may perform a DIS correction operation and a distortion correction operation with respect to an image obtained through the second camera 382, based on the first movement information and the movement information of the lens assembly (e.g., the reflective member 540) of the second camera 382. The processor 920 may include the OIS control module 950, a program module (kernel 930), a hardware abstraction layer (HAL) 940, and an image stabilization module 960.

According to an embodiment, the OIS control module 950 may control the OIS of the camera module 380. For example, the OIS control module 950 may control the OIS of the first camera 381 and/or the second camera 382 in the direction for correcting the shaking of the electronic device 301 to correspond to the first movement information. The OIS control module 950 may generate OIS movement information of the first camera 381 and/or the second camera 382 for OIS correction, based on the first movement information. According to embodiments, the processor 920 may correct shaking with respect to an image, which is obtained by the second camera 382, and the OIS movement information of the second camera 382 considered to correct the shaking may be referred to as the second movement information (or OIS movement data).

According to an embodiment, the OIS control module 950 may receive the first movement information from the motion sensor 910 and may receive a synchronization signal from the camera module 380. The OIS control module 950 may identify the first movement information corresponding to an image obtained from the camera module 380 using information on the time at which the synchronization signal is transmitted. For example, the OIS control module 950 may detect the first movement information received at a specific time, at which a synchronization signal is transmitted from the camera module 380, of a plurality of first movement information received from the motion sensor 910. The detected first movement information may be information corresponding to movement such as shaking of the electronic device 301 while the camera module 380 obtains the image at the specific time. The OIS control module 950 may identify the first movement information corresponding to the obtained image, and may transmit the first movement information and the OIS movement information, which corresponds to the first movement information, to the HAL 940.

According to an embodiment, the OIS control module 950 may control the movement of the second FOV of the second camera 382. For example, the OIS control module 950 may move the lens assembly (e.g., the reflective member 540) of the second camera 382 for OIS correction and object tracking. As described above, the second camera 382 may move the second FOV of the second camera 382 by rotating the reflective member 540.

According to an embodiment, the OIS control module 950 may generate the information for the movement (e.g., rotation) of the reflective member 540 of the second camera 382, and may rotate the reflective member 540 of the second camera 382 based on the movement information. The OIS control module 950 may generate second movement information, which corresponds to the movement of the reflective member 540 and is used to perform the OIS correction operation, and third movement information, which corresponds to the movement of the reflective member 540 and is used for the object tracking operation. For example, the OIS control module 950 may generate second movement information based on the first movement information to perform the OIS correction. For example, the OIS control module 950 may generate the third movement information to perform the tracking of the object, based on the position and/or amount of movement of the region of interest (ROI). The ROI may be an image area containing a object to be tracked.

According to an embodiment, the kernel 930 may receive an image obtained through the camera module 380. The kernel 930 may generate image time information on a time when the image is obtained from the camera module 380.

The hardware abstract layer (HAL) 940 may receive the first movement information and the OIS movement information (e.g., second movement information) from the OIS control module 950. The HAL 940 may receive first movement time information on the time at which the first movement information is received, from the OIS control module 950. The HAL 940 may match an image obtained at a specific time to the first movement information and the OIS movement information (e.g., the second movement information) corresponding to the image, by synchronizing the image, image time information, the first movement information, the first movement time information, and the OIS movement information.

According to an embodiment, the image stabilization module 960 may correct an image, which is, for example, blurred or distorted, obtained through the second camera 382. For example, the image stabilization module 960 may perform the DIS correction operation for the image, based on the first movement information, the second movement information, and/or the third movement information, and may correct the distortion caused by the lens assembly (e.g., the reflective member 540) after performing the DIS correction operation. For example, the image stabilization module 960 may include the distortion correcting module 970. The distortion correcting module 970 may correct the distortion based on a correction position and a distortion variation calculated by the image stabilization module 960.

According to embodiments of the disclosure, output information (e.g., the correction position, or the pixel position (coordinates)) necessary for the DIS correction may be calculated based on data obtained by removing the OIS correction and/or a movement amount (or a rotation amount of the reflective member 540) of the second camera 382, which results from the object tracking, from the movement information of the electronic device, and the shaking and the distortion may be corrected through one warping operation, by performing a correction using the output information, which is calculated through the DIS correction, as the input of the distortion information.

Figure 10:
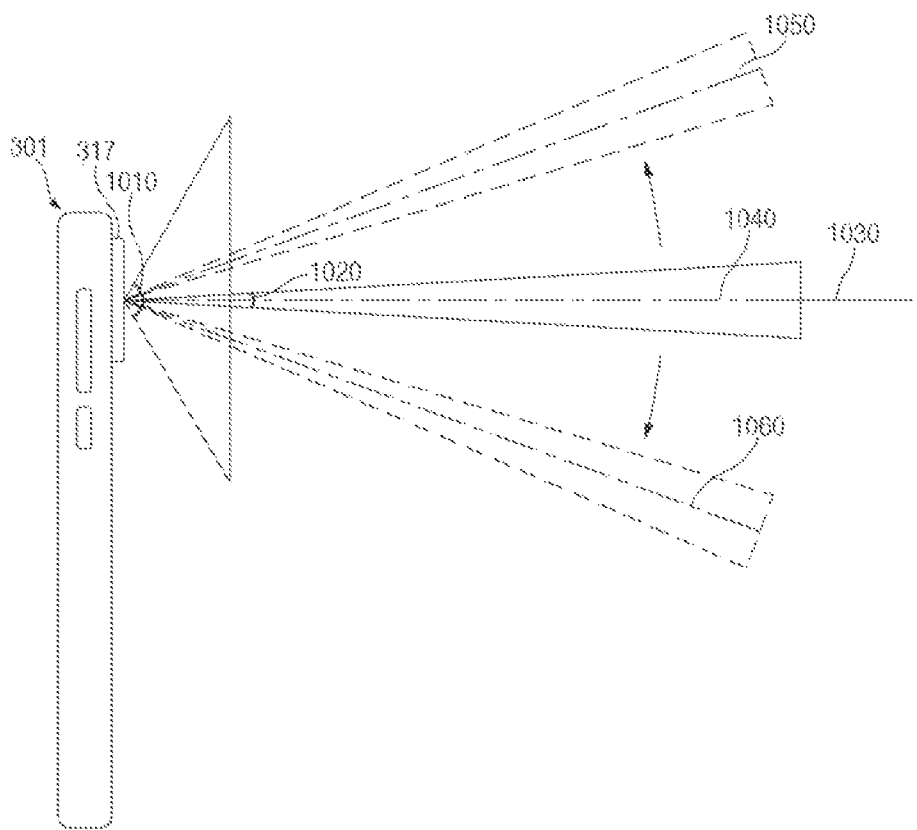
FIG. 10 illustrates capturing operations of a first camera and a second camera according to an embodiment.

FIG. 10 illustrates capturing operations of a first camera and a second camera according to an embodiment.

Referring to FIG. 10, the electronic device 301 according to an embodiment may be configured to move the second camera (e.g., the second camera 382 of FIG. 3) within the FOV of the first camera (e.g., the first camera 381 of FIG. 3). For example, the electronic device 301 may perform an OIS correction and/or object tracking operation by moving the second camera 382 within the FOV of the first camera 381.

According to an embodiment, the first camera 381 and the second camera 382 may obtain an image of an external object through the rear surface (e.g., the rear surface 313 of FIG. 4) of the housing (e.g., the housing 310 of FIG. 4) in the electronic device 301. For example, the first camera 381 and the second camera 382 may obtain an image of an object located in the rear direction of the electronic device 301. The camera decorating member 317 may be positioned on the rear surface 313 of the housing 310, and the camera decorating member 317 may be configured to support viewing angles of the first camera 381 and the second camera 382 through a plurality of transparent areas. For example, the first camera 381 and the second camera 382 may receive light incident from the outside of the housing 310 through the transparent area of the camera decorating member 317.

A first FOV 1010 of the first camera 381 is wider than a second FOV 1020 of the second camera 382 by a specific size. For example, the first camera 381 may be a wide-angle camera, and the second camera 382 may be a telephoto camera. The electronic device 301 may move the lens (e.g., the reflective member 540 of FIGS. 5 to 7) of the second camera 382 such that the second FOV 1020 of the second camera 382 may move within the first FOV 1010 of the first camera 381. For example, the electronic device 301 may move a central axis 1040 of the second FOV by rotating (e.g., yawing or pitching of FIG. 7) the reflective member 540 of the second camera 382.

According to an embodiment, the electronic device 301 may move the second central axis 1040 of the second FOV 1020 to a first position 1050 by rotating the reflective member 540. In addition, the electronic device 301 may move the second central axis 1040 of the second FOV 1020 to a second position 1060 by rotating the reflective member 540. For example, when a counterclockwise direction about a first central axis 1030 of the first FOV 1010 is defined as a positive (+) angle, and a clockwise direction about the first central axis 1030 of the first FOV 1010 is defined as a negative (−) angle, the second central axis 1040 may be positioned at the first position 1050 to form an included angle having a positive size, with respect to the first central axis 1030, and positioned at the second position 1060 to form an included angle having a negative size, with respect to the first central axis 1030. According to various embodiments, when the range of the first FOV 1010 is 100°, the second camera 382 may be configured such that the central axis 1040 of the second FOV 1020 moves in the range from +50° to −50°.

According to various embodiments, the first FOV 1010 of the first camera 381 may have the first central axis 1030 which is fixed, and the second FOV 1020 of the second camera 382 may have the second central axis 1040 which is movable within the range of the first FOV 1010 through a rotation operation of the reflective member 540 of the second camera 382. However, embodiments are not limited thereto. The first camera 381 may also be configured such that the first central axis 1030 of the first FOV 1010 moves.

According to an embodiment, the electronic device 301 may capture a moving picture while tracking an object. For example, the electronic device 301 may provide an image having an object positioned at the center of the image by moving the lens assembly (e.g., the reflective member 540) of the second camera 382. The electronic device 301 may provide the image having the object positioned at the center of the image by moving the reflective member 540 of the second camera 382, enlarging the image, and/or cropping the image.

According to various embodiments, the electronic device 301 may identify movement of an object from images obtained through the first camera 381, and may move the lens of the second camera 382 based on the identified movement. The direction in which the second FOV 1020 of the second camera 382 faces may be changed (e.g., the central axis 1040 may be moved to the first position 1050 or the second position 1060), as the lens moves. However, a method for tracking the object is not limited to the above example.

According to embodiments, as the second camera 382 may move largely within the range of the first FOV 1010 of the first camera 381, an image obtained through the second camera 382 may be distorted (e.g., perspective distortion). According to an embodiment, the electronic device 301 may more accurately correct the distortion of the image by applying rectification based on a correction position calculated by considering the movement information (e.g., gyro data) of the electronic device 301 and the movement information (e.g., the OIS movement data and/or movement data for object tracking) of the lens (or the reflective member 540) of the second camera 382.

Figure 11:
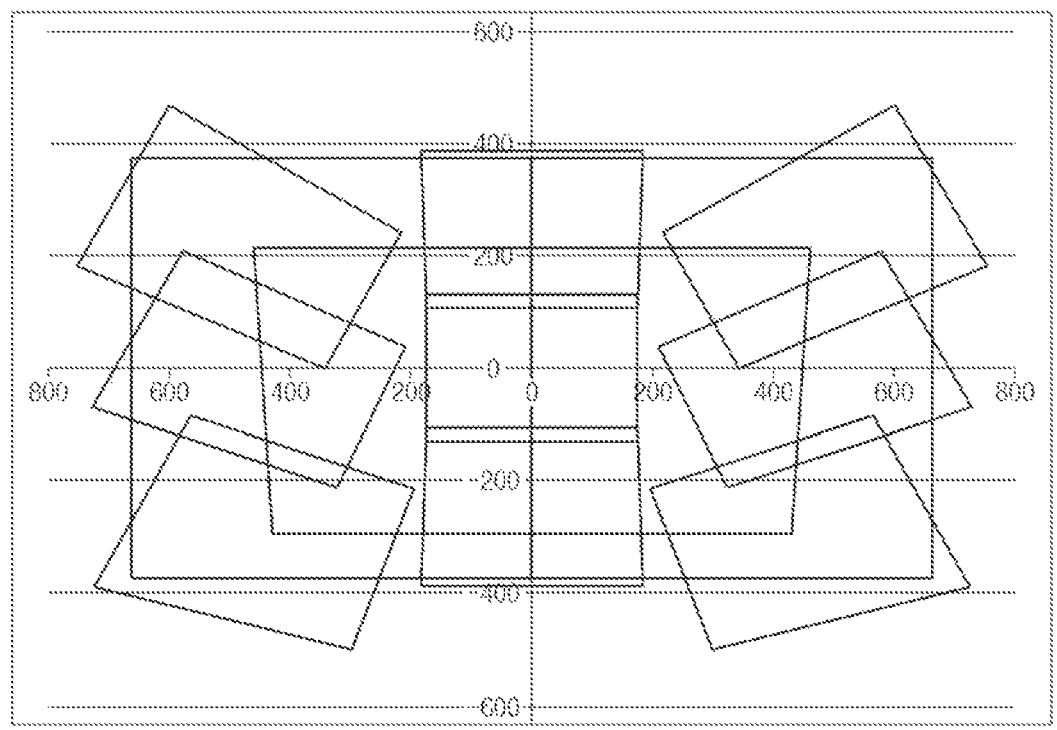
FIG. 11 illustrates a distortion correction operation of an electronic device according to an embodiment.
Figure 11:
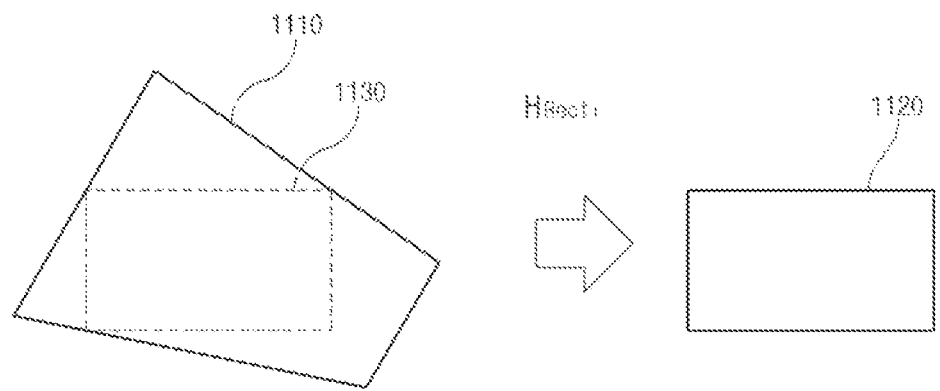

FIG. 11 illustrates a distortion correction operation of an electronic device according to an embodiment.

Referring to FIGS. 6 and 11, according to an embodiment, the second camera 382 may distort (e.g., perspective distortion) an image as the lens assembly (in particular, the reflective member 540 moves) moves. For example, when the reflective member 540 of the second camera 382 moves, the image sensor 531 generates the image by using the light that has passed through the lens unit 520 after the path is changed by the moved reflective member 540, and thus at least a portion of the image may be distorted.

According to an embodiment, the second camera 382 may be configured such that the reflective member 540 rotates about the first rotation axis 701 (e.g., yawing) or rotates about the second rotation axis 702 (e.g., pitching), in the state that the image sensor 531 is not moved. As the reflective member 540 rotates, when the central axis of the second FOV of the second camera 382 moves, the central axis of the second FOV is out of the center of the image sensor 531. Accordingly, the image may be distorted to correspond to the rotation of the reflective member 540 of the second camera 382. For example, when the reflective member 540 of the second camera 382 is in a basic state, the image may be a rectangular shape. However, when the reflective member 540 of the second camera 382 moves, the image may be distorted to be in a shape different than the rectangular shape, in particular in a trapezoidal shape.

According to an embodiment, referring to FIG. 10, when the center of the second FOV 1020 of the second camera 382 is matched to the center of the first FOV 1010 of the first camera 381, an image 1130 obtained by the second camera 382 may not be distorted and may have, for example, a rectangular shape. When the center of the second FOV 1020 of the second camera 382 is offset from the center of the first FOV 1010 of the first camera 381, an image 1110 obtained by the second camera 382 may be distorted to be in, for example, a trapezoidal shape. For example, the image may be distorted in a different shape depending on a direction in which the second FOV 1020 of the second camera 382 moves, and the distortion degree may increase, as the second FOV 1020 of the second camera 382 is away from the center of the first FOV 1010.

According to an embodiment, as the reflective member 540 of the second camera 382 relatively slightly moves, a object in the image may be slightly distorted or inclined. Accordingly, the correction for the image may not be necessary. For example, the reflective member 540 of the second camera 382 may move to a specific reference value or less for the OIS correction operation. In this case, the correction for the distortion of the image is not necessary.

According to an embodiment, as the movement of the reflective member 540 of the second camera 382 exceeds the specific range, a object in the image may be largely distorted or inclined. For example, the reflective member 540 of the second camera 382 may move to a specific reference value or more for the object tracking operation. In this case, the correction for the distortion of the image is necessary.

According to an embodiment, the electronic device 301 may convert the first image 1110 distorted in a trapezoidal shape into a second image 1120 having a rectangular shape by performing a distortion correction operation. For example, the electronic device 301 may correct the distortion of the image based on first correction information $H_{Recti}$ to correct the distortion. The first correction information $H_{Recti}$ may be a transform matrix. The electronic device 301 may convert the distorted first image 1110 to the second image 1120 through the transform matrix. For example, the electronic device 301 may determine a distortion variation of pixels by comparing pixels of the first image 1110 distorted with pixels of the second image 1120, and may compensate for the distortion of the image by using the determined distortion variation and the transform matrix.

According to embodiments, the electronic device 301 may correct the distorted image through the distortion correcting module 970 included in the image stabilization module 960. The distortion correcting module 970 performs the correction by using coordinates of an output pixel, which is calculated through the DIS correction operation, as an input of the distortion correction.

Figure 12:
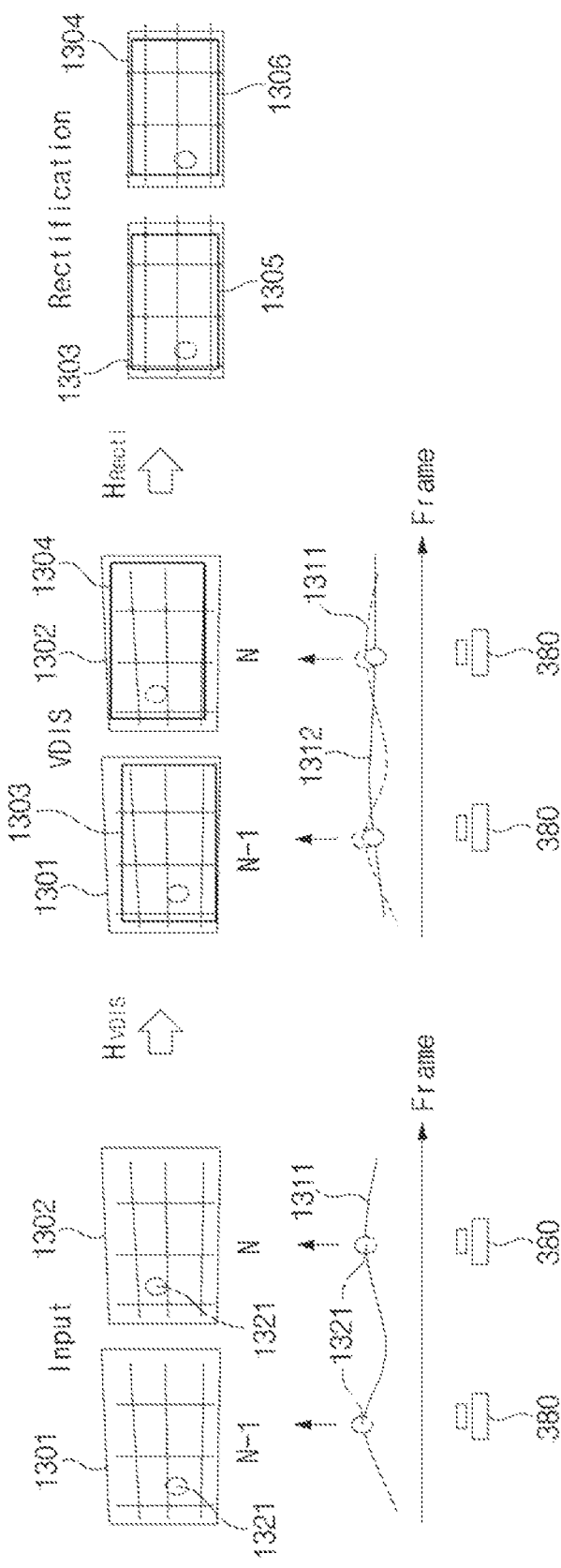
FIG. 12 illustrates an image stabilization operation and a distortion correction operation of an electronic device according to an embodiment.

FIG. 12 illustrates an image stabilization operation and a distortion correction operation of an electronic device according to an embodiment.

FIG. 12 may be a view illustrating an operation of performing a blurring correction operation and a distortion correction operation of an image, which is obtained through the second camera 382, based on the first movement information and the second movement information, when the reflective member (e.g., the reflective member 540 of FIGS. 5 to 7) of the second camera 382 for the object tracking does not rotate.

Referring to FIG. 12, the electronic device 301 may obtain a first frame 1301 and a second frame 1302 using the second camera 382. The frame may mean an image frame. The second frame 1302 (e.g., the N-th frame) may be a frame subsequent to the first frame 1301 (e.g., the (N−1)-th frame) on a time domain. The first frame 1301 and the second frame 1302 may be consecutive image frames of a plurality of image frames obtained through the second camera 382.

According to an embodiment, while the first frame 1301 and the second frame 1302 including an object 1321 are being obtained through the second camera 382, the electronic device 301 (or the camera module 380) may be shaken due to external factors such as the user's hand shaking. The electronic device 301 calculates output information (e.g., a correction position) necessary for a DIS correction operation, based on the first movement information and the second movement information, and performs a distortion correction operation, based on the calculated correction position.

According to an embodiment, the processor 920 may perform a correction operation including the first correction operation and the second correction operation for the image frames 1301 and 1302 obtained using the second camera 382 through the image stabilization module. For example, the first correction operation may be referred to as the distortion correction operation, and the second correction operation may be referred to as the DIS correction operation.

According to an embodiment, the processor 920 may receive the first frame 1301 and the second frame 1302, which are OIS-corrected to correspond to the first movement information, from the second camera 382. As described above, the processor 320 may detect the first movement information and the second movement information synchronized with the first frame 1301 and the second frame 1302, based on the synchronization signal received from the second camera 382 at the time point at which the second camera 382 obtains the first frame 1301 and the second frame 1302. The processor 920 may perform the DIS correction operation based on the first movement information and the second movement information. In this case, the processor 920 may perform the DIS correction operation based on the fifth movement information obtained by removing the second movement information from the first movement information. For example, the processor 320 may generate second correction information $H_{VDIS}$ for the DIS correction operation, based on the fifth movement information, and may perform the DIS correction operation by using the second correction information $H_{VDIS}$. For example, the second correction information $H_{VDIS}$ may be a matrix.

According to an embodiment, the processor 920 may calculate distortion variation amounts of the first frame 1301 and the second frame 1302 to generate the first correction information $H_{Recti}$ for the distortion correction operation, and may perform the distortion correction operation by using the output information (e.g., the position of the output pixel) calculated based on the second correction information $H_{VDIS}$ as an input for the distortion correction operation. The processor 920 may output images obtained by performing the DIS correction operation (e.g., second correction) and the distortion correction operation (e.g., first correction) based on Equation 1.

$$\begin{bmatrix} X \\ Y \end{bmatrix} = H_{recti} * H_{VDIS} \begin{bmatrix} x \\ y \end{bmatrix} \quad \text{[Equation 1]}$$

According to an embodiment, the image may include a plurality of pixels. The electronic device 301 may convert information on pixels into two-dimensional coordinates to correct an image. For example, the electronic device 301 may convert the position of an arbitrary pixel into coordinates x and y. In Equation 1, coordinates x and y may refer to positions of pixels included in the first frame 1301 and/or the second frame 1302, and coordinates x and y may be changed to coordinates X and Y through image correction based on the first correction information $H_{Recti}$ and the second correction information $H_{VDIS}$.

According to an embodiment, a movement trajectory (e.g., a first movement trajectory 1311) of the second camera 382 may be caused due to a movement such as the shaking of the electronic device 301. The electronic device 301 may rotate the reflective member 540 of the second camera 382 for an OIS correction operation. Accordingly, the image obtained through the second camera 382 may be distorted. For example, the first frame 1301 and the second frame 1302 may be distorted in a trapezoidal shape, and internal grid patterns of the first frame 1301 and the second frame 1302 may be tilted or distorted. In this case, the objects 1321 included in the frames 1301 and 1302 may be distorted in a shape different from a real shape. However, the rotation amount of the reflective member 540 through the OIS correction operation is not large. Accordingly, the image distortion based on the rotation amount may be relatively low.

According to an embodiment illustrated in FIG. 12, the object 1321 may be fixed without relatively moving with respect to the camera module 380 (or the electronic device), and the camera module 380 may be shaken by the user's hand shaking. The image frames 1301 and 1302 obtained by the second camera 382 may be distorted by rotation of the reflective member 540 for correcting the user's hand shaking. For example, the reflective member 540 is not rotated other than the purpose of the correction of the user's hand shaking. Accordingly, the first frame 1301 and the second frame 1302 are distorted in substantially the same form. In addition, the positions of the object 1321 on the first frame 1301 and the second frame 1302 may be different from each other due to the shaking of the camera module 380.

According to an embodiment, the DIS correction operation may be a method of securing a margin area by cropping a specified first output area 1303 and a specified second output area 1304 from the first frame 1301 and the second frame 1302. The margin area may refer to an area obtained by excluding the output areas 1303 and 1304 from the first frame 1301 and the second frame 1302. For example, the output areas 1303 and 1304 may be determined based on at least one of a specified number of pixels, a specified field of view, or a specified viewing angle. The DIS correction operation may be performed by adjusting positions of the output areas 1303 and 1304 in the first frame 1301 and the second frame 1302, based on the first movement information and the second movement information. For example, the processor 920 (e.g., the image stabilization module 960) may adjust the positions of the output areas 1303 and 1304 within the margin area, based on the first movement information and the second movement information.

As illustrated in FIG. 12, the DIS correction may be understood as an operation of correcting a first movement trajectory 1311 of the camera to a first correction trajectory 1312. The first correction trajectory 1312 may refer to a camera trajectory in which shaking is corrected. For example, the first correction trajectory 1312 is a trajectory (or position) of the camera after determining the stabilization path, and the determining the stabilization path may be referred to as camera path planning. According to an embodiment, the DIS correction operation may be performed, based on a camera trajectory (e.g., the first movement trajectory 1311) before determining the stabilization path and a camera trajectory (e.g., the first correction trajectory 1312) after determining the stabilization path. For example, a difference between the first movement trajectory 1311 and the first correction trajectory 1312 may refer to a DIS correction amount. As the DIS correction operation is performed, the object 1321 included in the first frame 1301 and the second frame 1302 may be placed at substantially the same position in the first output area 1303 and the second output area 1304.

According to an embodiment, the distortion correction operation may be a method of securing a margin area by cropping a specified third output area 1305 and a specified fourth output area 1306 from the first output area 1303 and the second output area 1304. For example, the third output area 1305 may be set to have a smaller size than the first output area 1303, and the fourth output area 1306 may be set to have a smaller size than the second output area 1304. As the distortion correction is performed, the grid patterns inside the first output area 1303 and the second output area 1304 may be corrected to be straight, and the shape of the output image may be corrected to a rectangular shape FIG. 13 illustrates an image stabilization operation and a distortion correction operation of an electronic device according to an embodiment.

Figure 13:
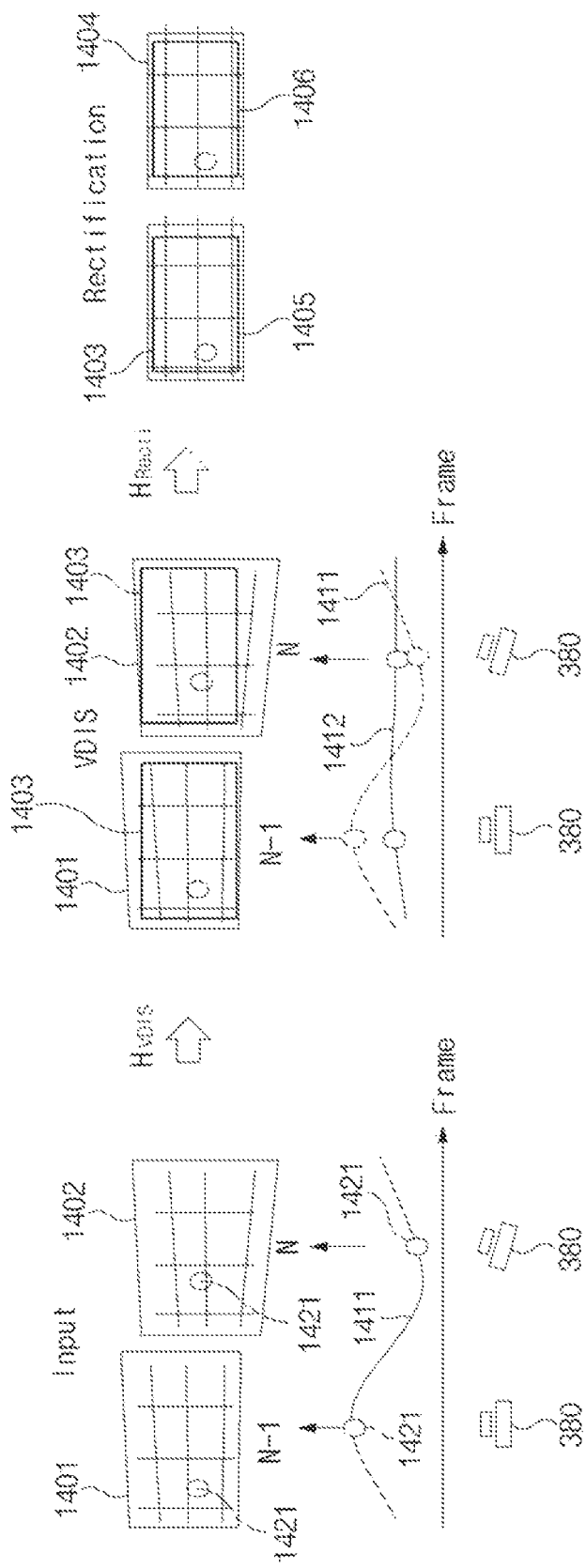
FIG. 13 illustrates an image stabilization operation and a distortion correction operation of an electronic device according to an embodiment.

FIG. 13 may be a view illustrating an image stabilization operation and a distortion correction operation for an image, based on the first movement information, the second movement information, and the third movement information, when the reflective member (e.g., the reflective member 540 of FIGS. 5 to 7) of the second camera 382 for the object tracking moves.

For example, FIG. 13 is a view illustrating a correction operation based on the movement of the reflective member 540 for the object tracking. In the following description, the duplicated description of the description made with reference to FIG. 12 is omitted.

Referring to FIG. 13, the electronic device 301 may obtain a first frame 1401 and a second frame 1402 by tracking an object using the second camera 382. For example, the electronic device 301 may capture a moving picture while tracking an object by moving the reflective member 540 of the second camera 382. As described above, as the movement amount (e.g., rotation amount) of the reflective member 540 is increased, the image may be significantly distorted, and the movement trajectory of the camera may be largely changed. For example, when the movement of the reflective member 540 for the object tracking is absent, the movement trajectory of the camera is not largely changed as illustrated in FIG. 12. However, when the movement of the reflective member 540 for the object tracking is present, the movement trajectory of the camera may be significantly largely changed as illustrated in FIG. 13.

According to an embodiment illustrated in FIG. 13, the camera module 380 may move the FOV of the second camera 382 to track the object, and may be shaken due to the user's hand shaking. The image frames 1401 and 1402 obtained by the second camera 382 may be distorted by rotating the reflective member 540 for correcting the user's hand shaking and for object tracking. For example, the reflective member 540 is rotated due to the object tracking. Accordingly, the first frame 1401 and the second frame 1402 are distorted in mutually different shapes. In addition, the positions of an object 1421 on the first frame 1401 and the second frame 1402 may be different from each other, as the camera module 380 is shaken.

According to an embodiment, the electronic device 301 may calculate a correction position necessary for the DIS correction operation, based on the first movement information, the second movement information, and the third movement information, and may perform the distortion correction operation, based on the calculated correction position.

According to an embodiment, the processor 920 may receive the first frame 1401 and the second frame 1402, which are OIS-corrected to correspond to the first movement information, from the second camera 382. The processor 920 may perform the DIS correction operation based on the first movement information, the second movement information and the third movement information. In this case, the processor 920 may perform the DIS correction operation, based on the sixth movement information obtained by removing the second movement information and the third movement information from the first movement information. For example, the processor 320 may generate second correction information $H_{VDIS}$ for the DIS correction operation, based on the sixth movement information, and may perform the DIS correction operation based on the second correction information.

According to an embodiment, the processor 920 may calculate distortion variation amounts of the first frame 1401 and the second frame 1402 to generate the first correction information $H_{Recti}$ for the distortion correction, and may perform the distortion correction by using the correction position information calculated based on the second correction information $H_{VDIS}$ as an input of the distortion correction operation. The processor 920 may output images obtained by performing the DIS correction operation (e.g., the second correction operation) and the distortion correction operation (e.g., the first correction operation) based on Equation 1 described with reference to FIG. 12. For example, as illustrated in FIG. 13, when the movement of the reflective member 540 for the tracking of the object 1421 is made, the second correction information $H_{VDIS}$ may be changed, when comparing with the case of FIG. 12.

As described above, the DIS correction operation may be understood as an operation of correcting a second movement trajectory 1411 of the camera to a second correction trajectory 1412. The second correction trajectory 1412 may refer to a camera trajectory in which shaking is corrected. For example, the second correction trajectory 1412 is a trajectory (or position) of the camera after determining the stabilization path. According to an embodiment, the DIS correction operation may be performed, based on a camera trajectory (e.g., the second movement trajectory 1411) before determining the stabilization path and a camera trajectory (e.g., the second correction trajectory 1412) after determining a stabilization path. For example, a difference between the second movement trajectory 1411 and the second correction trajectory 1412 may refer to a DIS correction amount. When comparing with the embodiment of FIG. 12, according to the embodiment of FIG. 13, as the rotation of the reflective member 540 for the object tracking operation is additionally made, the change in the second movement trajectory 1411 is greater than the change in the first movement trajectory 1311. Accordingly, the DIS correction amount is relatively increased. As the DIS correction is performed, the object 1421 included in the first frame 1401 and the second frame 1402 may be placed at substantially the same position in a first output area 1403 and a second output area 1404.

According to an embodiment, the distortion correction may be a method of securing a margin area by cropping a specified third output area 1405 and a specified fourth output area 1406 from the first output area 1403 and the second output area 1404. For example, the third output area 1405 may be set to be in a smaller size than that of the first output area 1403, and the fourth output area 1406 may be set to be in a smaller size than that of the second output area 1404. As the distortion correction is performed, the lattice pattern inside the first output area 1403 and the second output area 1404 may be corrected to be straight, and the shape of the output image may be corrected to be in a rectangular shape.

According to an embodiment, an electronic device 301 may include a camera module 380 including a first camera 381 having a first FOV 1010 and a second camera 382 having a second FOV 1020 narrower than the first FOV, and a motion sensor 910, and a processor 320 or 920 electrically connected to the camera module and the motion sensor. The second camera includes a lens unit 520 including at least one lens, a reflective member 540 to rotate relatively to the lens unit, and an image sensor 531 to generate an electrical signal using light incident through the reflective member and the lens unit. The second FOV may be configured to be positioned in the first FOV, and the processor may be configured to obtain an image using the camera module, obtain first movement information on the electronic device, which is shaken, from the motion sensor to correspond to obtaining the image, determine movement information of the reflective member of the second camera through at least one of an OIS correction operation or an object tracking operation during at least a portion of a period in which the image is obtained, obtain output information by performing an image stabilization operation for the image, based on at least one of the first movement information or the movement information of the reflective member, and output an image corrected by correcting distortion of the image, based on a distortion variation resulting from the movement of the reflective member and the output information. The electronic device is capable of reducing degradation of image quality by factoring in not only the motion of the device itself but further the information of the movement of the reflective member due to OIS correction operation and/or object tracking. This information is directly used for image stabilization and its generated output information is again direct input for a successive distortion correction. The electronic device can thus minimize degradation of the image quality and reduce current consumption. The device can correct blurring and distortion that is caused by the movement of the FOV of the camera in the camera system capable of moving the FOV of the camera (or the lens) using the reflective member.

According to various embodiments, the movement information of the reflective member may include second movement information corresponding to the movement of the reflective member of the second camera, which is generated (or obtained) as the OIS correction operation is performed, and third movement information corresponding to the movement of the reflective member of the second camera, which is generated (or obtained) as the object tracking operation is performed. Thus, the electronic device can correct blurring and distortion that is caused by two movement mechanisms of the reflective member, i.e. the object tracking as well as OIS correction movement.

According to various embodiments, the processor may be configured to obtain a plurality of first movement information from the motion sensor, during the at least the portion of the period in which the image is obtained, and determine the first movement information, which corresponds to the image obtained, of the plurality of first movement information. The device can record the device movement in the period and then use the information which is relevant for the image capturing. A matching error in the use of movement information is reduced According to various embodiments, the processor may be configured to receive a synchronization signal from at least one of the first camera or the second camera, at a time point at which the at least one of the first camera or the second camera obtains the image.

According to various embodiments, the processor may be configured to determine a synchronized first movement information corresponding to the time point, at which the at least one of the first camera or the second camera obtains the image, of the plurality of first movement information, based on the synchronization signal. In this case, a matching error is systematically reduced since it can be avoided that movement information corresponding to times other than when the image capturing occurs is used. Thereby, an additional error source when using movement information for correcting the blurring and distortion is eliminated or at least substantially reduced. Thus, precision of correction of distortion and blurring is systematically improved.

According to various embodiments, the processor may be configured to perform the image stabilization operation, based on movement information obtained by removing the movement information of the reflective member, e.g. second and/or third movement information, from the first movement information. In this manner, image stabilization operation and thus distortion correction is improved by using a rectified movement of the electronic device from which the reflective member movement caused by object tracking and/or OIS correction movement is subtracted.

According to various embodiments, the processor may be configured to perform the image stabilization operation, based on the at least one of the second movement information or the third movement information, and the first movement information, depending on whether the object tracking operation is performed.

According to various embodiments, the processor may be configured to perform the image stabilization operation, based on movement information obtained by removing the second movement information and the third movement information from the first movement information, when the object tracking operation is performed. Thereby, blurring and distortion caused by the movement of the FOV of the camera in the camera system capable of moving the FOV of the camera (or the lens) using the reflective member is reduced.

According to various embodiments, the processor may be configured to determine the distortion variation of the image distorted, as the reflective member of the second camera moves, and perform the distortion correction operation based on the distortion variation. The output information may be used as an input for the distortion correction operation.

According to various embodiments, the distortion variation may indicate a distortion degree of pixels constituting the image. The processor may be configured to determine the distortion variation based on the movement information of the reflective member, and at least a portion of the image distorted may be corrected based on the distortion variation.

According to various embodiments, the processor may be configured to move the second FOV of the second camera within the first FOV of the first camera by rotating the reflective member.

According to an embodiment, a method for operating an electronic device 301 may include obtaining an image by using at least one of a first camera 381 having a first FOV 1010 or a second camera 382 including a reflective member 540 and having a second FOV 1020 narrower than the first FOV, obtaining first movement information on the electronic device, which is shaken, from a motion sensor 910 to correspond to obtaining the image, determining movement information of the reflective member of the second camera through at least one of an OIS correction operation or an object tracking operation during at least a portion of a period in which the image is obtained, obtaining output information by performing an image stabilization operation for the image, based on at least one of the first movement information or the movement information of the reflective member, and outputting an image corrected by correcting distortion of the image, based on a distortion variation resulting from the movement of the reflective member and the output information.

According to various embodiments, the movement information of the reflective member may include second movement information corresponding to the movement of the reflective member of the second camera, which is generated (or obtained), as the OIS correction operation is performed, and third movement information corresponding to the movement of the reflective member of the second camera, which is generated (or obtained) as the object tracking is performed.

According to various embodiments, obtaining of the first movement information may include obtaining a plurality of first movement information from the motion sensor, during the at least the portion of the period in which the image is obtained, and determining the first movement information, which corresponds to the obtained image, of the plurality of first movement information.

According to various embodiments, the method of operating an electronic device 301 may further include receiving a synchronization signal from at least one of the first camera or the second camera, at a time point at which the at least one of the first camera or the second camera obtains the image.

According to various embodiments, the obtaining of the first movement information may include determining a synchronized first movement information corresponding to the time point, at which the at least one of the first camera or the second camera obtains the image, of the plurality of first movement information, based on the synchronization signal.

According to various embodiments, the obtaining of the output information may include performing the image stabilization operation, based on the at least one of the second movement information or the third movement information, and the first movement information, depending on whether the object tracking operation is performed.

According to various embodiments, the method of operating an electronic device 301 may further include performing the image stabilization operation, based on movement information obtained by removing the second movement information and the third movement information from the first movement information, when the object tracking operation is performed.

According to various embodiments, the method of operating an electronic device 301 may further include determining the distortion variation of the image distorted as the reflective member of the second camera moves. The distortion correction operation may be performed based on the distortion variation, and the output information may be used as an input for the distortion correction operation.

According to various embodiments, the distortion variation may indicate a distortion degree of pixels constituting the image, the distortion variation may be determined based on the movement information of the reflective member, and at least a portion of the image distorted may be corrected based on the distortion variation.

According to various embodiments, the second camera may include a lens unit 520 including a lens, and an image sensor 531 to generate an electrical signal using light incident through the reflective member and the lens unit. The reflective member may be configured to rotate relatively to the image sensor and the lens unit, and the method of operating an electronic device 301 may further include moving the second FOV of the second camera within the first FOV of the first camera by rotating the reflective member.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a camera module comprising a first camera having a first field of view (FOV) and a second camera having a second FOV narrower than the first FOV, the second FOV is positioned in the first FOV;
   a motion sensor; and
   a processor electrically connected to the camera module and the motion sensor,
   wherein the second camera comprises:
     at least one lens;
     a reflective member configured to rotate relative to the at least one lens; and
     an image sensor configured to generate an electrical signal based on light incident through the reflective member and the at least one lens, and
   wherein the processor is configured to:
     obtain an image using the camera module;
     obtain, from the motion sensor, first movement information of the electronic device which is shaken, to correspond to the obtaining of the image;
     obtain information on movement of the reflective member of the second camera according to at least one of an optical image stabilizer (OIS) correction operation or an object tracking operation during at least a portion of a period in which the image is obtained;
     obtain output information by performing an image stabilization operation with respect to the image, based on at least one of the first movement information or the information on the movement of the reflective member; and
     output an image corrected by correcting distortion of the image, based on a distortion variation resulting from the movement of the reflective member and the output information.

2. The electronic device of claim 1, wherein the information on the movement of the reflective member comprises:
   second movement information corresponding to the movement of the reflective member of the second camera, which is made as the OIS correction operation is performed; and
   third movement information corresponding to the movement of the reflective member of the second camera which is made, as the object tracking operation is performed.

3. The electronic device of claim 1, wherein the processor is further configured to:
   obtain a plurality of first movement information from the motion sensor while at least partially obtaining the image; and
   obtain the first movement information, which corresponds to the obtained image, among the plurality of first movement information.

4. The electronic device of claim 3, wherein the processor is further configured to:
   receive a synchronization signal from at least one of the first camera or the second camera, at a time point at which the at least one of the first camera or the second camera obtains the image.

5. The electronic device of claim 4, wherein the processor is further configured to:
   obtain, based on the synchronization signal, synchronized first movement information corresponding to the time point, at which the at least one of the first camera or the second camera obtains the image, among the plurality of first movement information.

6. The electronic device of claim 2, wherein the processor is further configured to:
   perform the image stabilization operation, based on the first movement information and the at least one of the second movement information or the third movement information, according to whether the object tracking operation is performed.

7. The electronic device of claim 6, wherein the processor is further configured to:
   perform the image stabilization operation, based on movement information which is obtained by removing the second movement information and the third movement information from the first movement information, when the object tracking operation is performed.

8. The electronic device of claim 1, wherein the processor is further configured to:
   obtain the distortion variation of the image distorted as the reflective member of the second camera moves; and
   perform the correcting distortion of the image based on the distortion variation, and
   wherein the output information is used as an input for the correcting the distortion of the image.

9. The electronic device of claim 8, wherein the distortion variation indicates a distortion degree of pixels included in the image distorted,
   wherein the processor is further configured to:
     obtain the distortion variation based on the information on the movement of the reflective member, and
   wherein at least a portion of the image distorted is corrected based on the distortion variation.

10. The electronic device of claim 1, wherein the processor is further configured to:
    move the second FOV of the second camera within the first FOV of the first camera by rotating the reflective member.

11. A method for operating an electronic device, the method comprising:
    obtaining an image using at least one of a first camera having a first field of view (FOV) or a second camera comprising a reflective member and having a second FOV narrower than the first FOV, the second FOV is positioned in the first FOV;
    obtaining, from a motion sensor, first movement information of the electronic device, which is shaken to correspond to the obtaining of the image;
    obtaining information on movement of the reflective member of the second camera according to at least one of an optical image stabilizer (OIS) correction operation or an object tracking operation during at least a portion of a period in which the image is obtained;

obtaining output information by performing an image stabilization operation with respect to the image based on at least one of the first movement information or the information on the movement of the reflective member; and outputting an image corrected by correcting distortion of the image based on a distortion variation resulting from the movement of the reflective member and the output information.

12. The method of claim 11, wherein the information on the movement of the reflective member comprises:

second movement information corresponding to the movement of the reflective member of the second camera, which is made as the OIS correction operation is performed; and third movement information corresponding to the movement of the reflective member of the second camera, which is made as the object tracking operation is performed.

13. The method of claim 11, wherein the obtaining of the first movement information comprises:

obtaining a plurality of first movement information from the motion sensor, while at least partially obtaining the image; and obtaining the first movement information, which corresponds to the obtained image, among the plurality of first movement information.

14. The method of claim 13, further comprising:

receiving a synchronization signal from at least one of the first camera or the second camera, at a time point at which the at least one of the first camera or the second camera obtains the image.

15. The method of claim 14, wherein the obtaining of the first movement information comprises:

obtaining, based on the synchronization signal, synchronized first movement information corresponding to the time point at which the at least one of the first camera or the second camera obtains the image, among the plurality of first movement information.

16. The method of claim 12, wherein the obtaining of the output information comprises:

performing the image stabilization operation, based on the first movement information and the at least one of the second movement information or the third movement information, according to whether the object tracking operation is performed.

17. The method of claim 16, further comprising:

performing the image stabilization operation, based on movement information which is obtained by removing the second movement information and the third movement information from the first movement information, when the object tracking operation is performed.

18. The method of claim 11, further comprising:

obtaining the distortion variation of the image distorted as the reflective member of the second camera moves;

wherein the correcting the distortion of the image is performed based on the distortion variation, and wherein the output information is used as an input for the correcting the distortion of the image.

19. The method of claim 18, wherein the distortion variation indicates a distortion degree of pixels included in the image, wherein the distortion variation is obtained based on the information on the movement of the reflective member, and wherein at least a portion of the image distorted is corrected based on the distortion variation.

20. The method of claim 11, wherein the second camera comprises:

a lens assembly; and an image sensor configured to generate an electrical signal using light incident through the reflective member and the lens assembly, wherein the reflective member is configured to rotate relative to the image sensor and the lens assembly, and wherein the method further comprises:

moving the second FOV of the second camera within the first FOV of the first camera by rotating the reflective member.

* * * * *